(12) United States Patent
Ahn et al.

(10) Patent No.: US 8,072,565 B2
(45) Date of Patent: Dec. 6, 2011

(54) TRANSFLECTIVE LIQUID CRYSTAL DISPLAY DEVICE

(75) Inventors: Byung Chul Ahn, Anyang-si (KR); Jong Woo Park, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/756,319

(22) Filed: Apr. 8, 2010

(65) Prior Publication Data

US 2010/0195009 A1    Aug. 5, 2010

Related U.S. Application Data

(62) Division of application No. 11/143,658, filed on Jun. 3, 2005, now Pat. No. 7,760,309.

(30) Foreign Application Priority Data

Jun. 5, 2004   (KR) .............................. 2004-041143

(51) Int. Cl.
   *G02F 1/136*   (2006.01)
   *G02F 1/1335*   (2006.01)
(52) U.S. Cl. ............................ 349/114; 349/43; 349/113
(58) Field of Classification Search .................. 349/114, 349/43
   See application file for complete search history.

(56) References Cited

U.S. PATENT DOCUMENTS

| 4,778,560 | A | 10/1988 | Takeda et al. |
| 5,162,933 | A | 11/1992 | Kakuda et al. |
| 5,317,433 | A | 5/1994 | Miyawaki et al. |
| 5,339,181 | A | 8/1994 | Kim et al. |
| 5,462,887 | A | 10/1995 | Gluck |
| 5,668,379 | A | 9/1997 | Ono et al. |
| 5,731,856 | A | 3/1998 | Kim et al. |
| 5,771,083 | A | 6/1998 | Fujihara et al. |
| 5,781,253 | A | 7/1998 | Koike et al. |
| 5,793,460 | A | 8/1998 | Yang |
| 5,847,781 | A | 12/1998 | Ono et al. |
| 6,043,971 | A | 3/2000 | Song et al. |

(Continued)

FOREIGN PATENT DOCUMENTS

JP    2002-107762    4/2002

(Continued)

*Primary Examiner* — Lauren Nguyen
(74) *Attorney, Agent, or Firm* — McKenna Long & Aldridge LLP

(57) ABSTRACT

A liquid crystal display device is provided that includes: first and second substrate; a gate line of a double layer having a first transparent conductive layer and a second opaque conductive layer on the first substrate; a first insulation layer on the gate line; a data line crossing the gate line to define a pixel region, the pixel region having a transmissive region and a reflective region; a thin film transistor connected to the gate and data lines; a pixel electrode formed of the transparent conductive layer in the pixel region; an upper storage electrode forming a storage capacitor by overlapping the gate line with the gate insulating film there between; a transmission hole to exposing the pixel electrode by passing through a second insulation layer on the thin film transistor to the first insulation layer; a reflective electrode connecting the pixel electrode with a drain electrode and the upper storage electrode through an edge part of the transmission hole; a gate pad extending from the first conductive layer of the gate line; a data pad formed of the first conductive layer and connected to the data line through a data link; and a liquid crystal layer between the first and second substrates, wherein the first and second insulation layers are removed in the gate and data pads.

18 Claims, 41 Drawing Sheets

U.S. PATENT DOCUMENTS

| | | | |
|---|---|---|---|
| 6,620,655 B2 * | 9/2003 | Ha et al. | 438/149 |
| 6,664,149 B2 * | 12/2003 | Shih | 438/151 |
| 7,298,436 B2 | 11/2007 | Misaki et al. | |
| 2002/0021403 A1 | 2/2002 | Kim et al. | |
| 2003/0020845 A1 | 1/2003 | Lee et al. | |
| 2003/0133059 A1 * | 7/2003 | Wei et al. | 349/113 |
| 2003/0197181 A1 * | 10/2003 | Yun | 257/72 |
| 2003/0202133 A1 | 10/2003 | Yun | |
| 2004/0021813 A1 * | 2/2004 | Kim et al. | 349/113 |
| 2004/0150759 A1 | 8/2004 | Nishino et al. | |

FOREIGN PATENT DOCUMENTS

| | | |
|---|---|---|
| KR | 10-2001-0087658 | 9/2001 |
| KR | 10-2004-0041491 | 5/2004 |

* cited by examiner

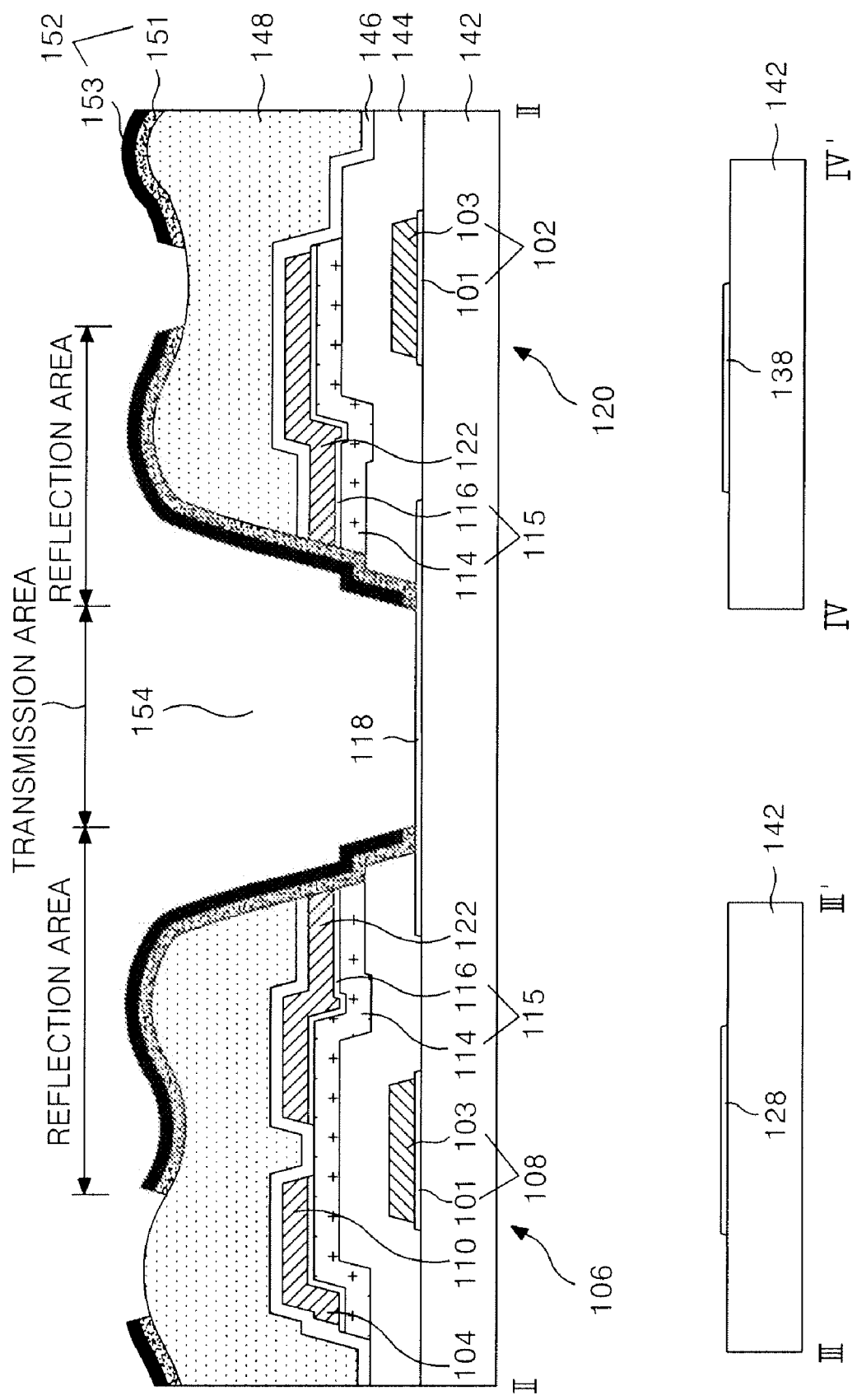

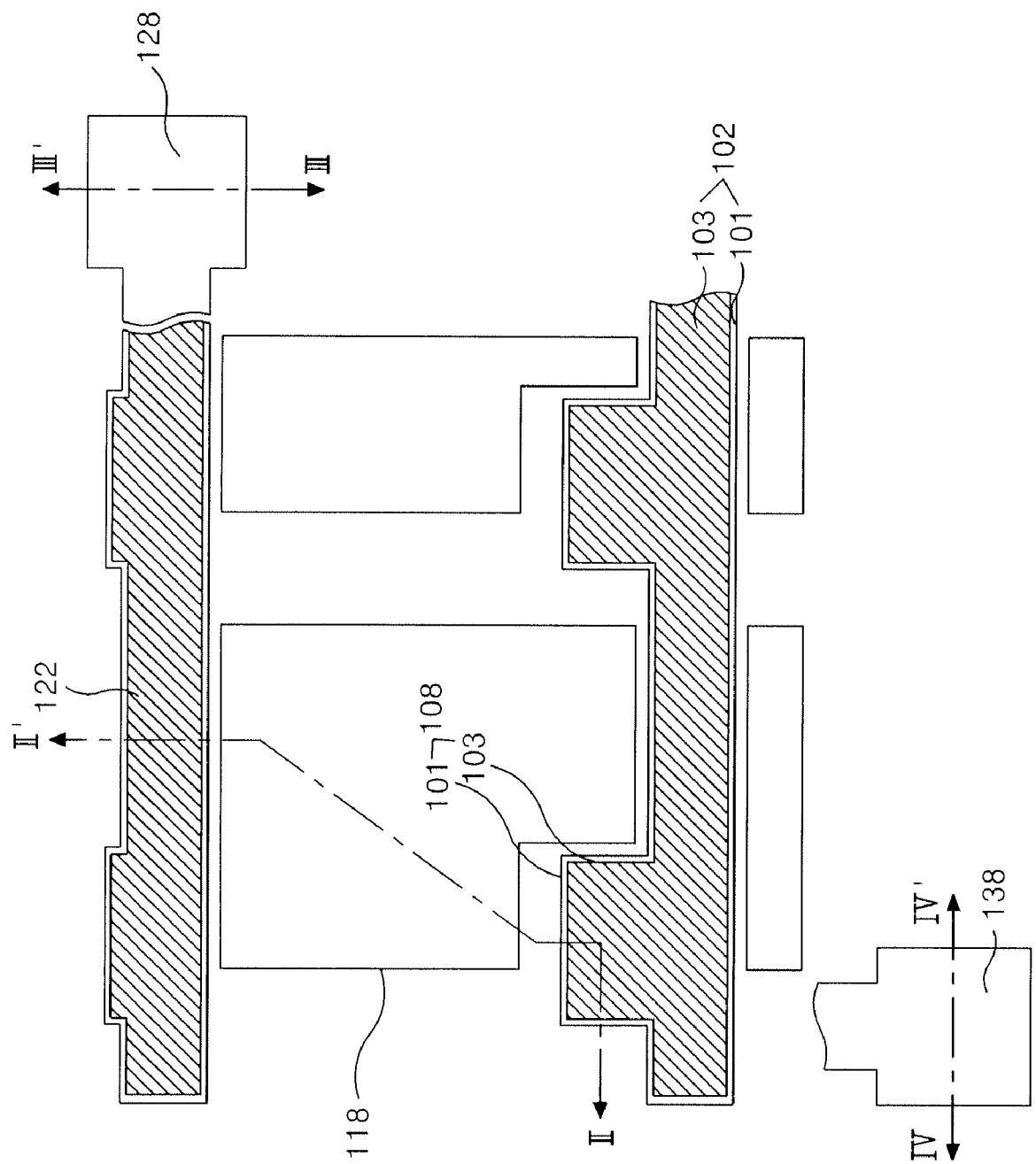

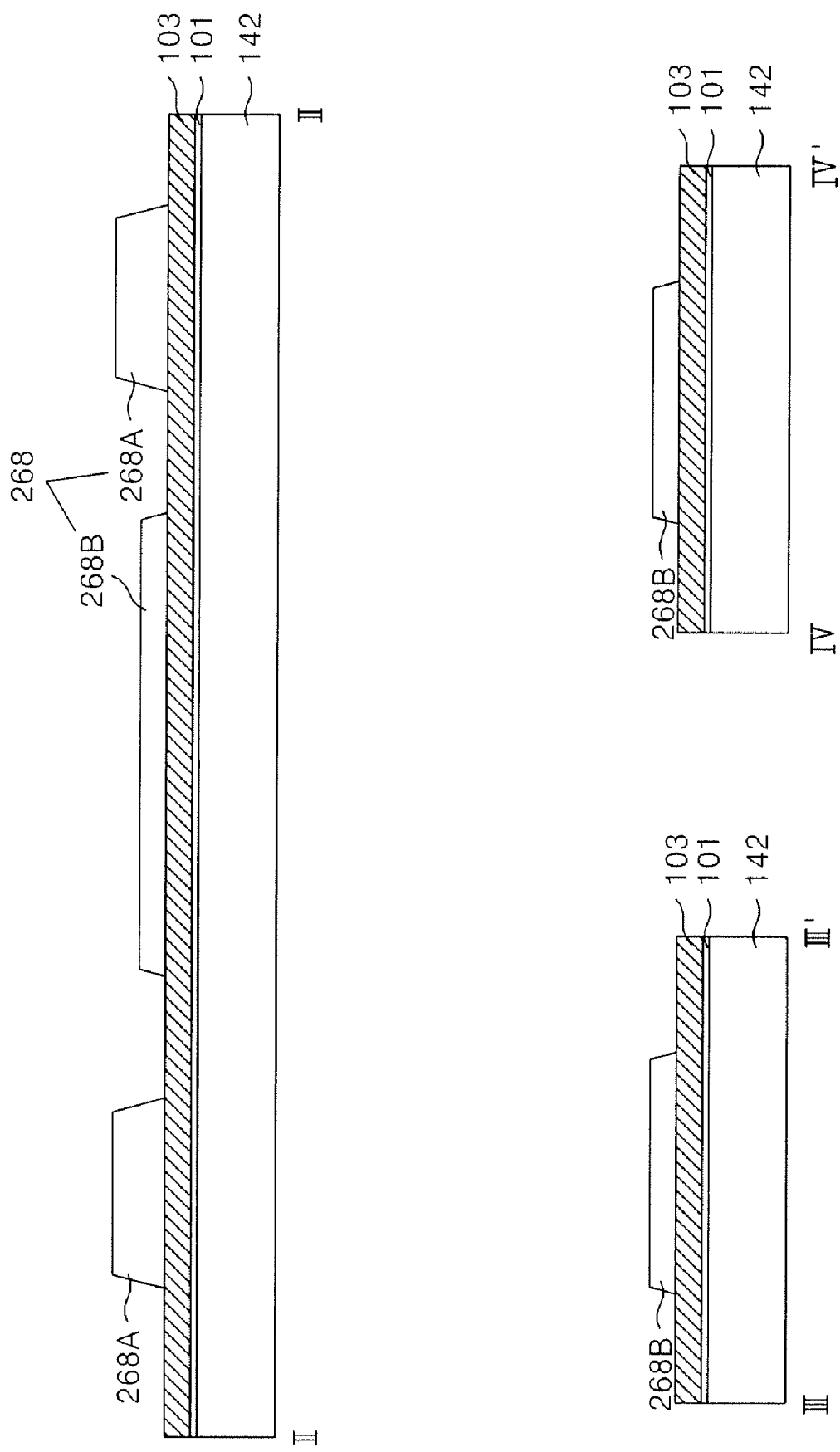

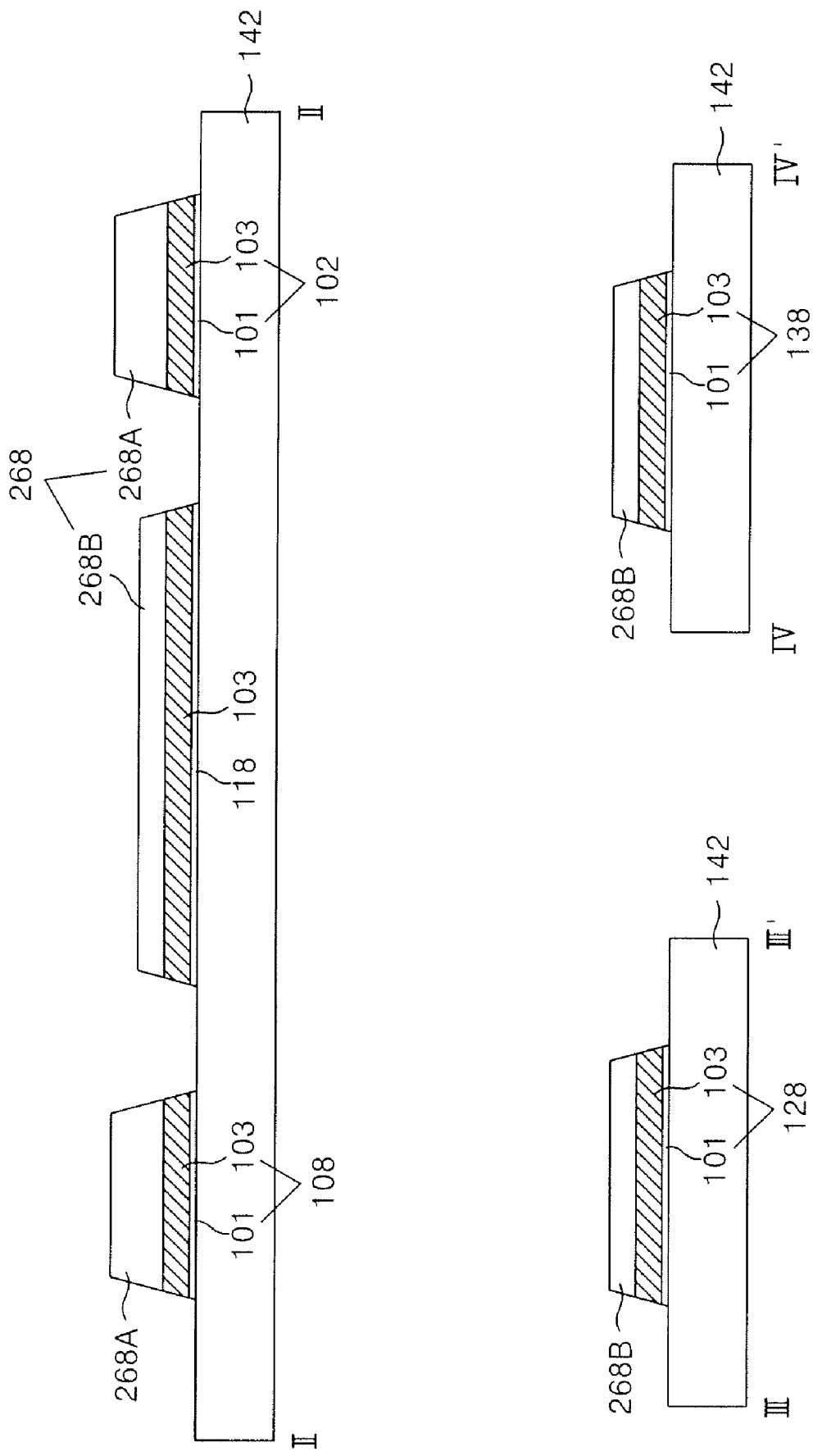

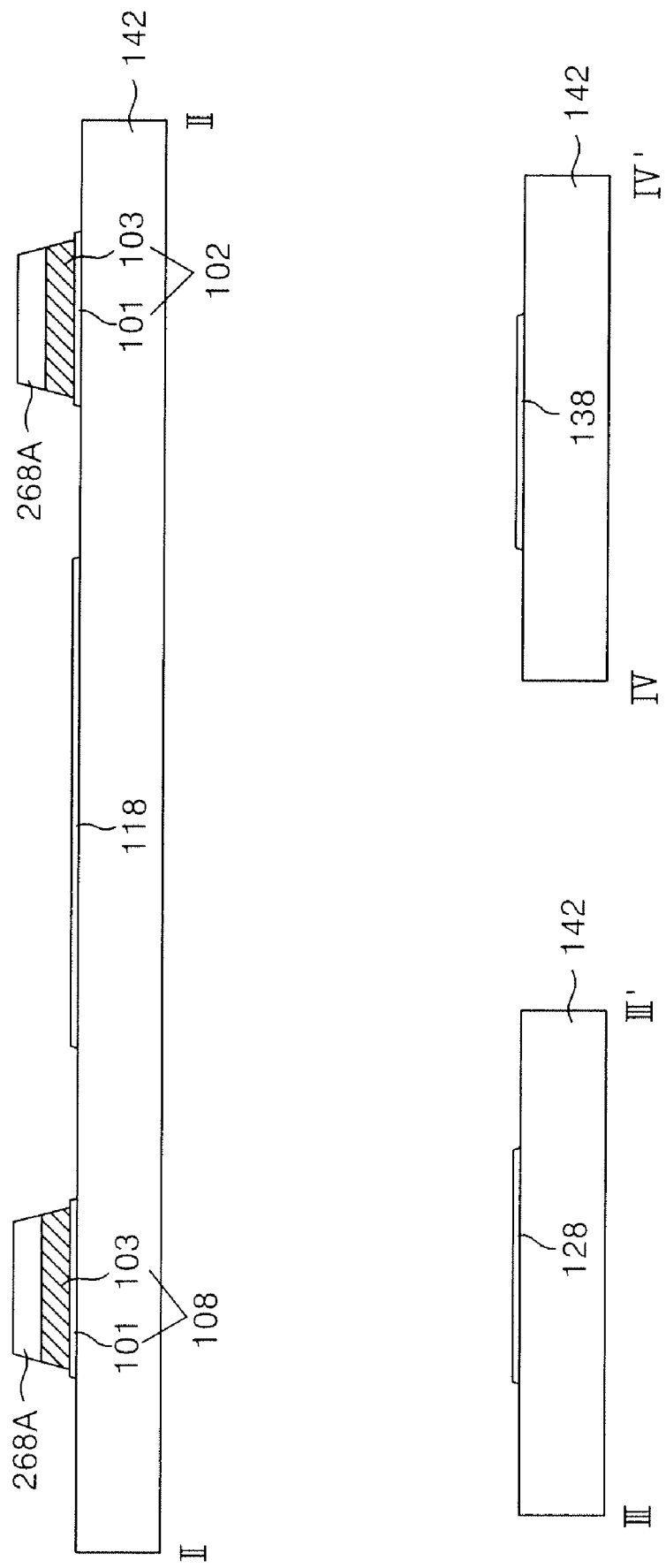

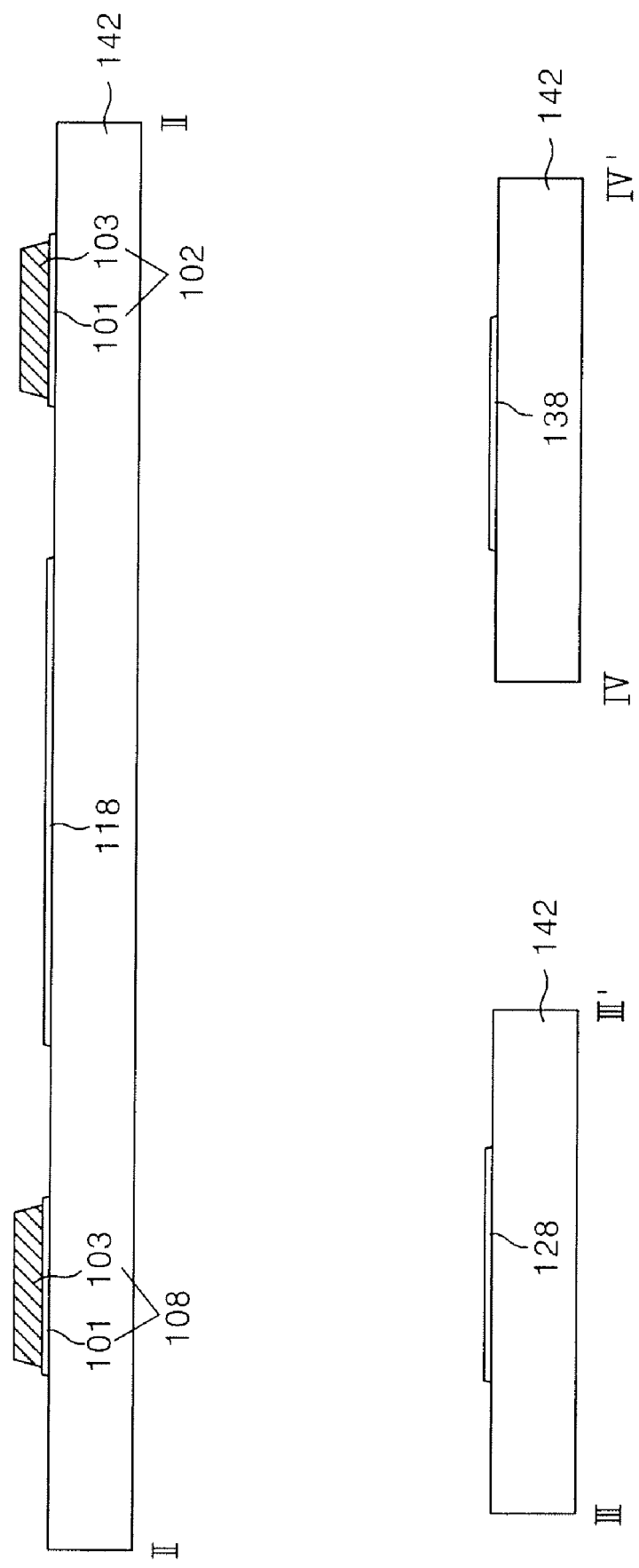

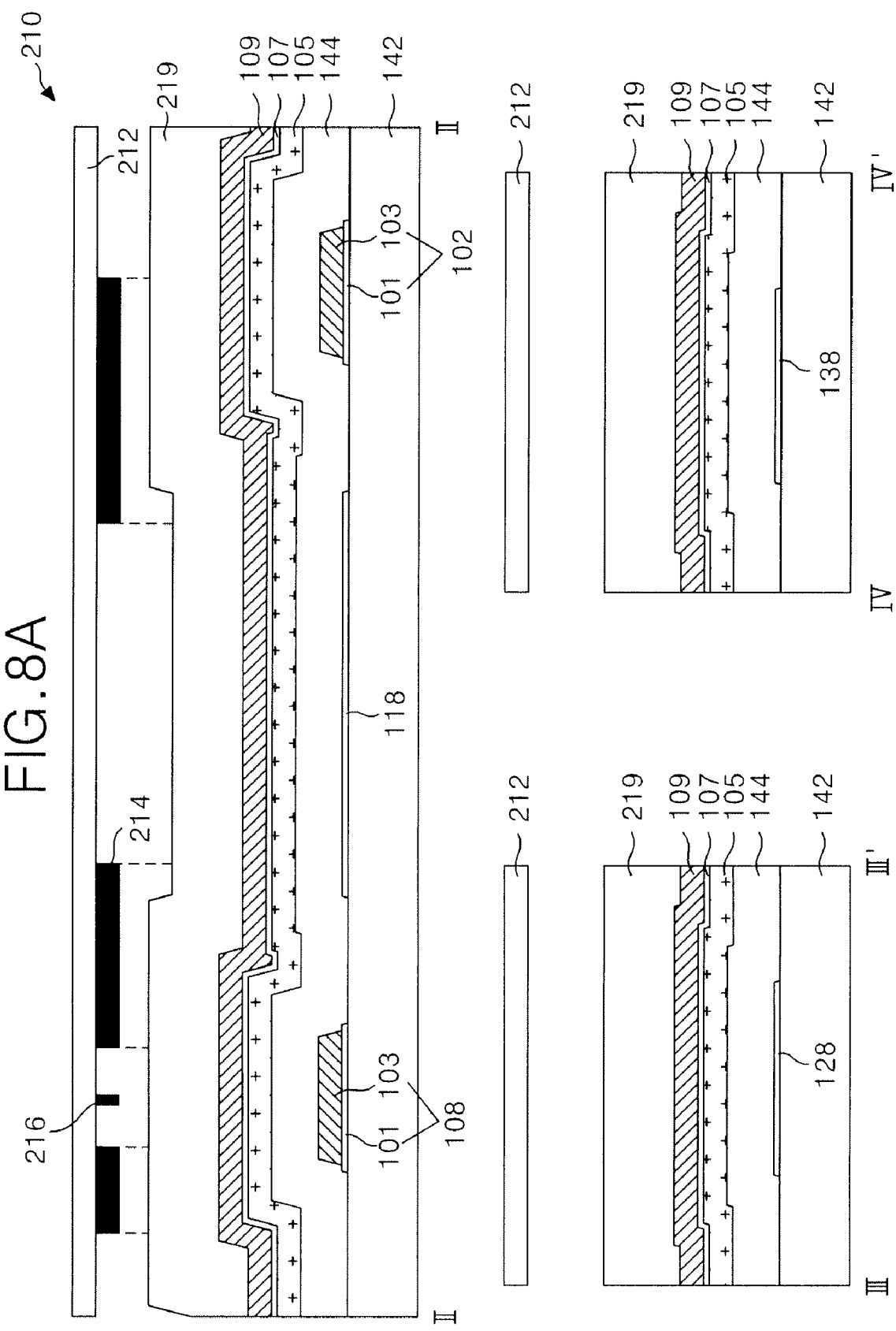

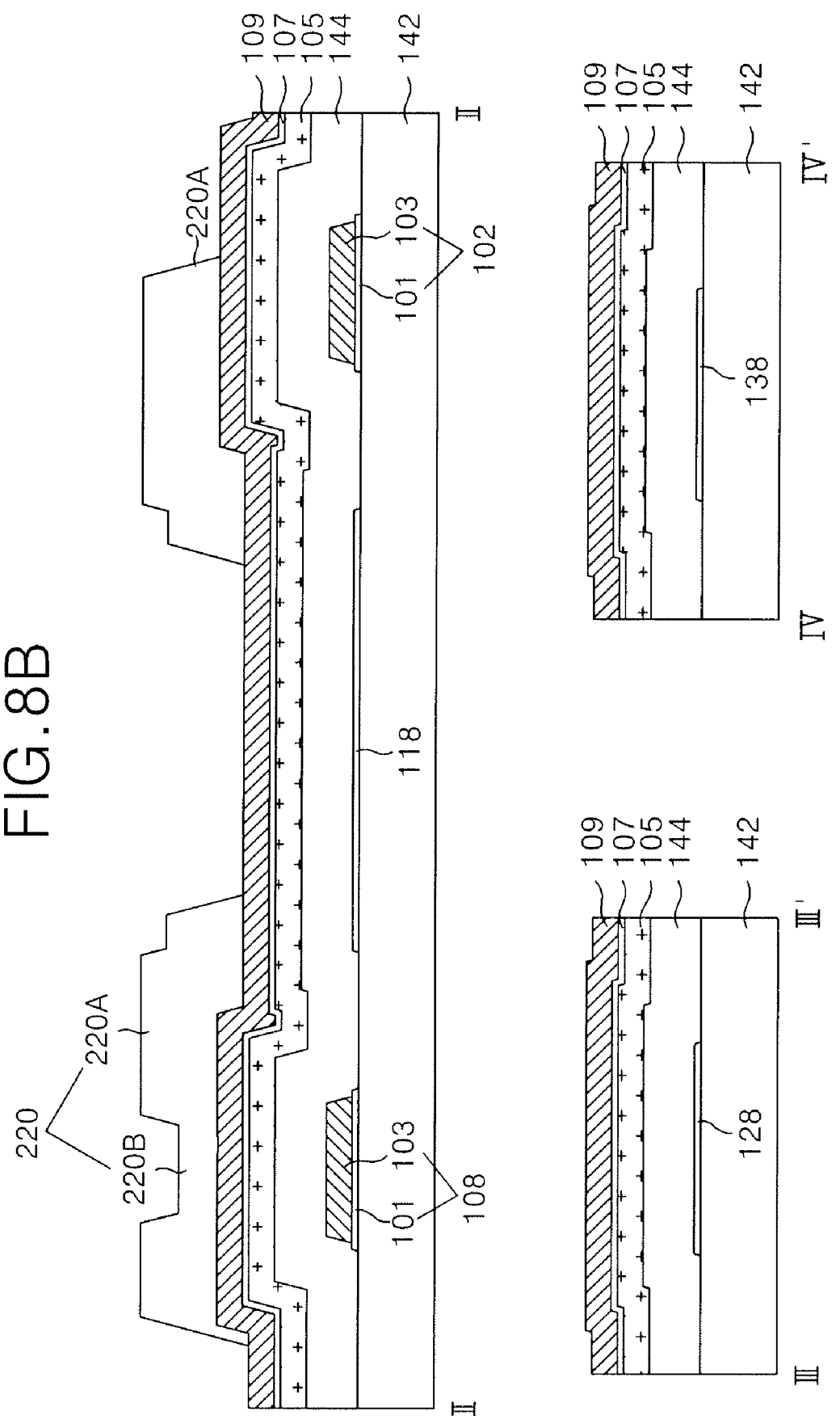

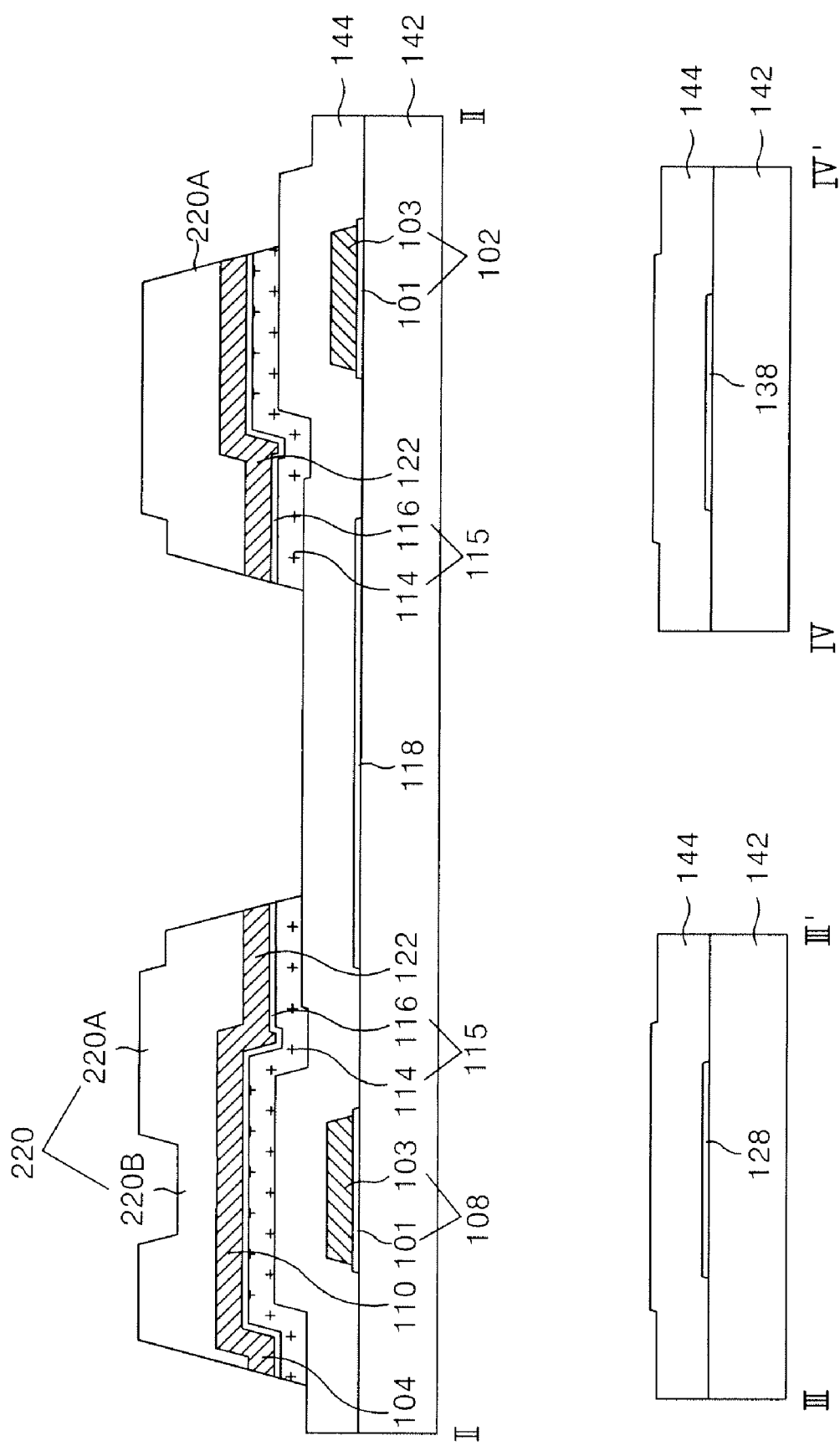

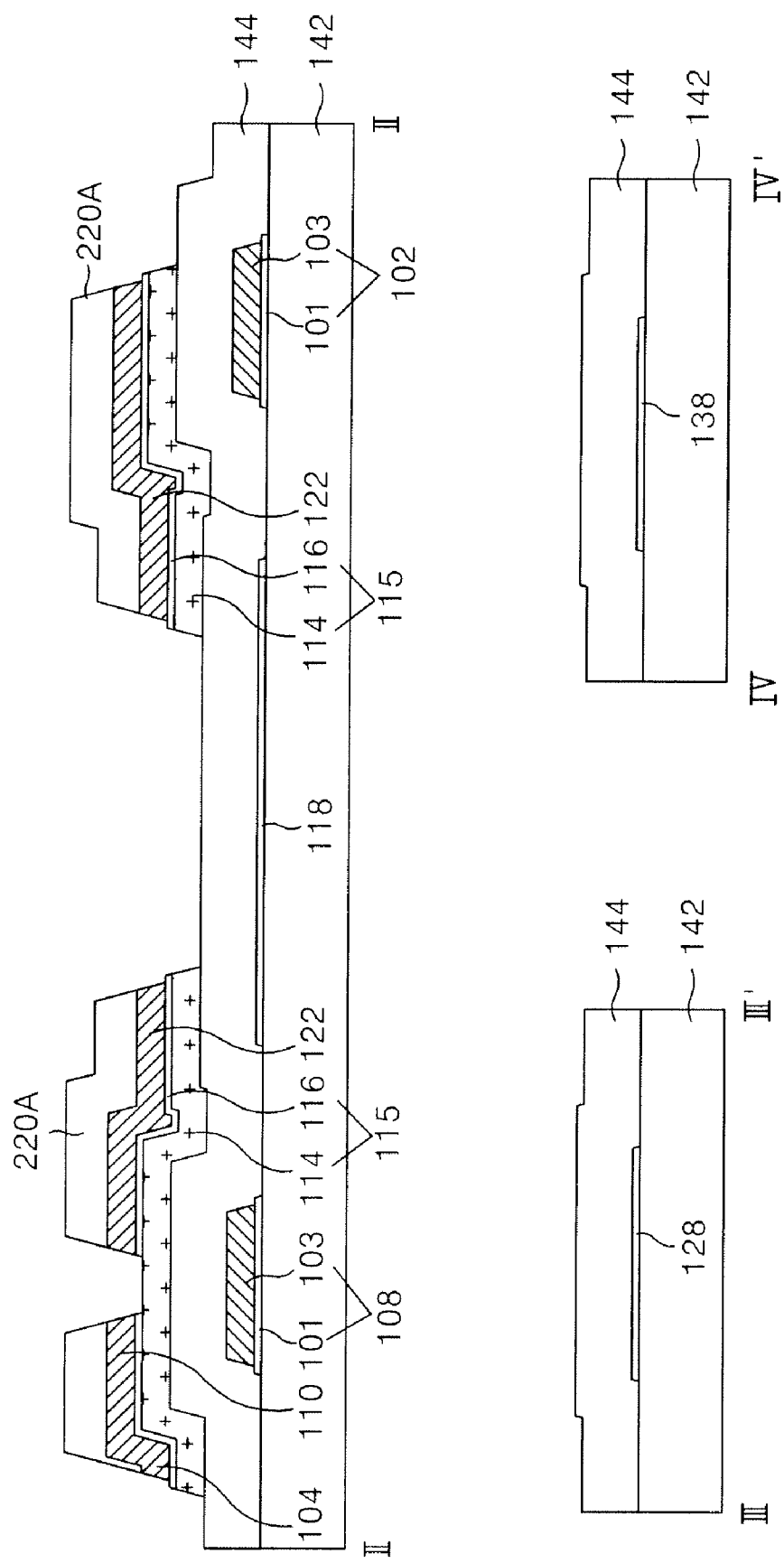

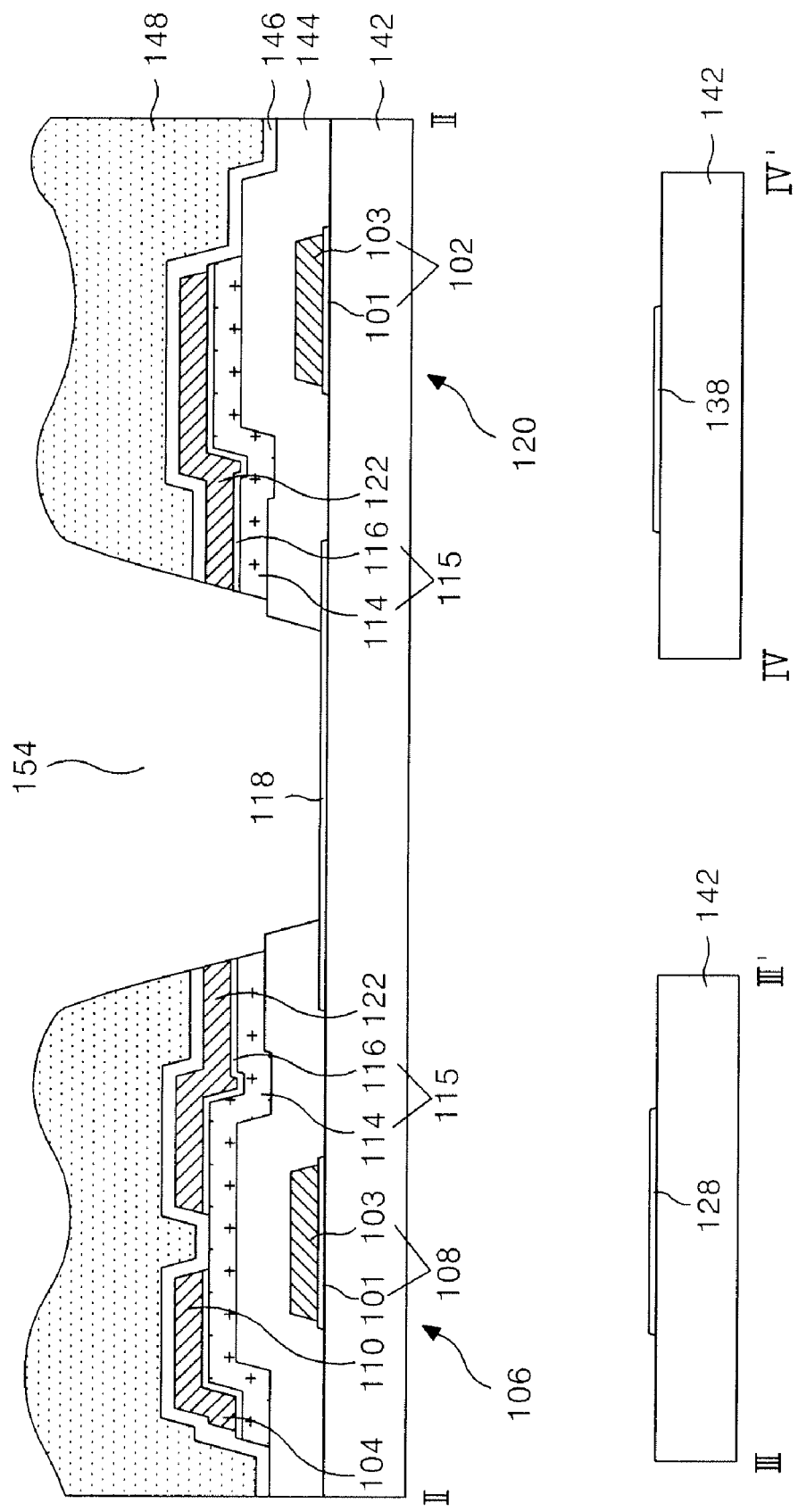

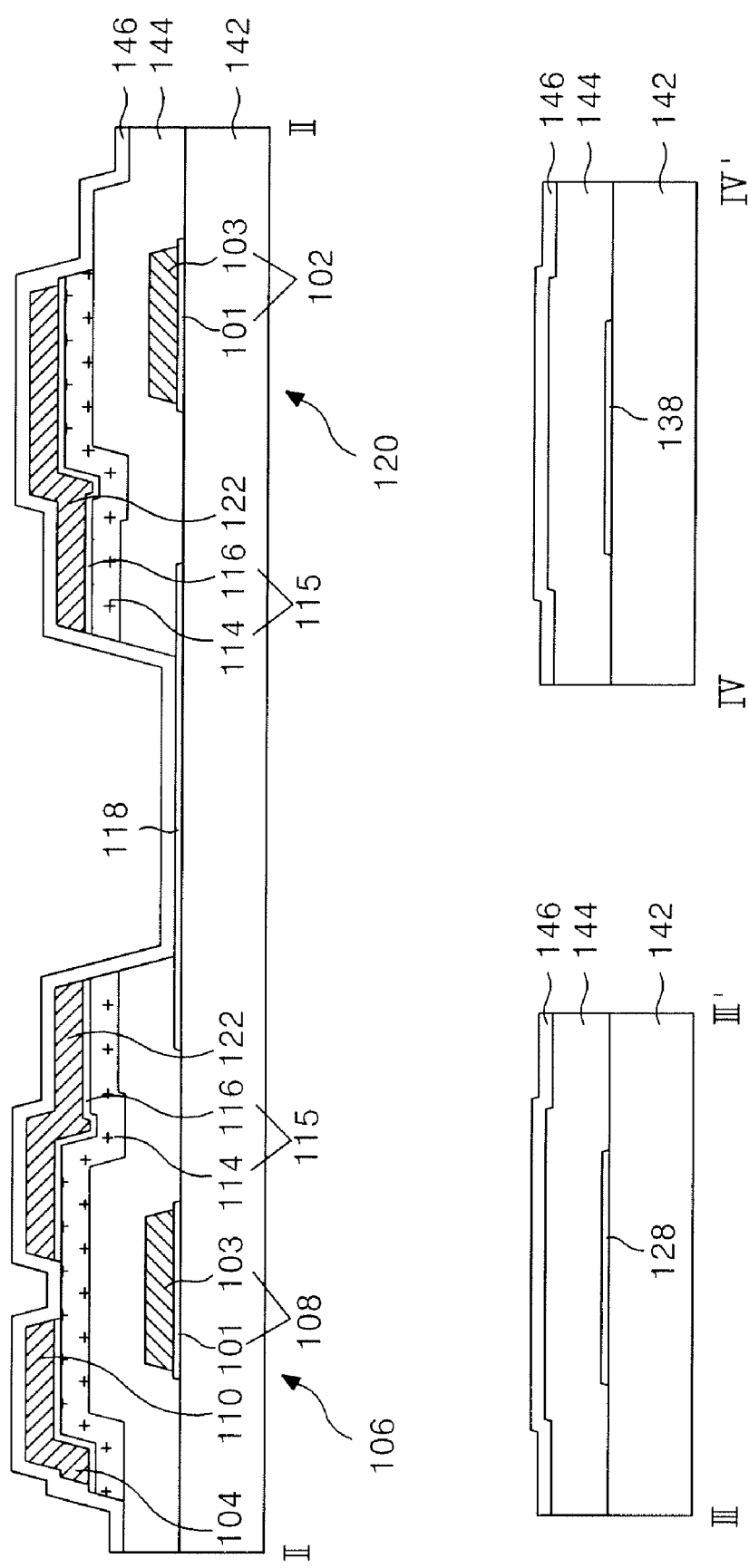

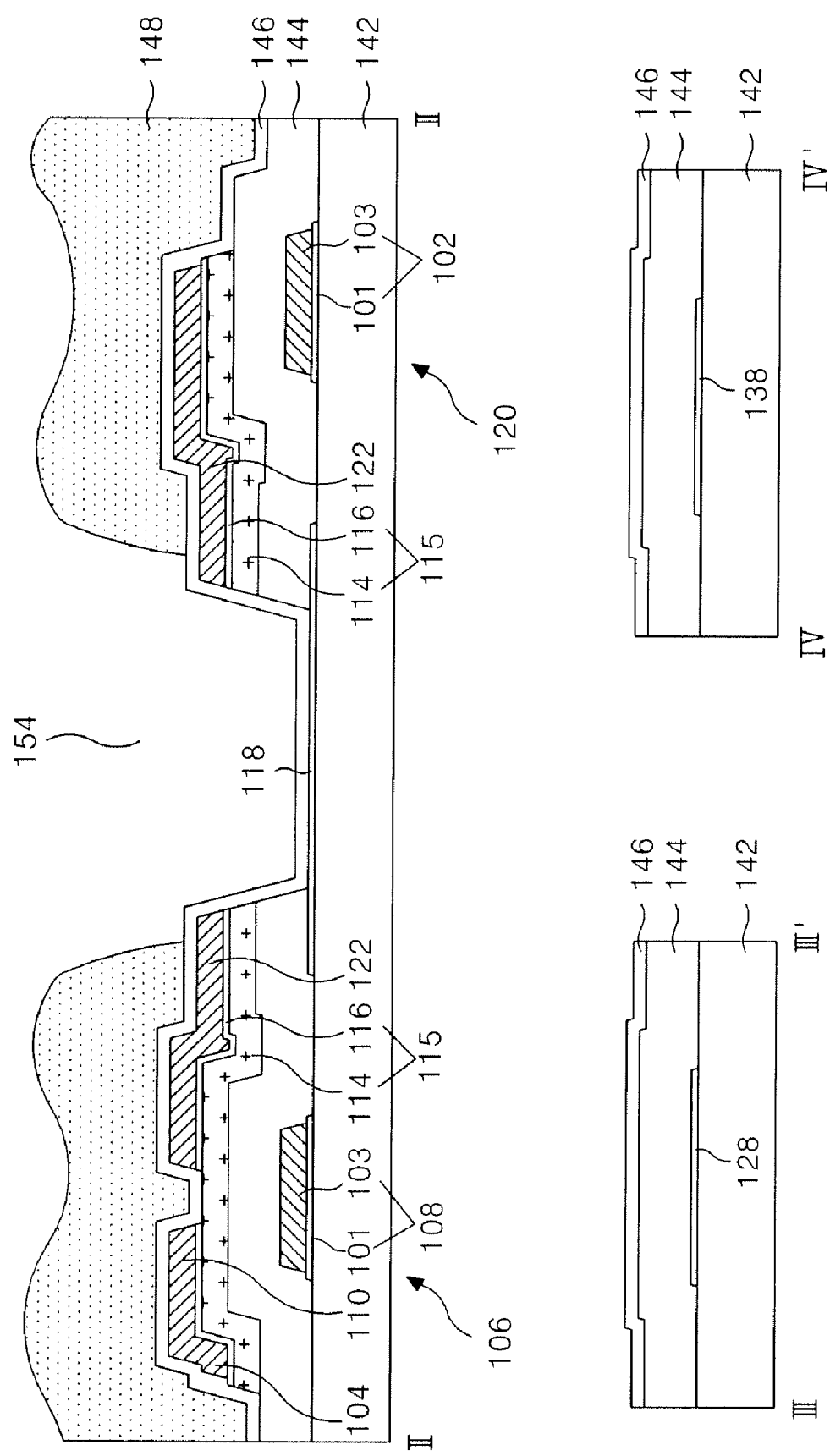

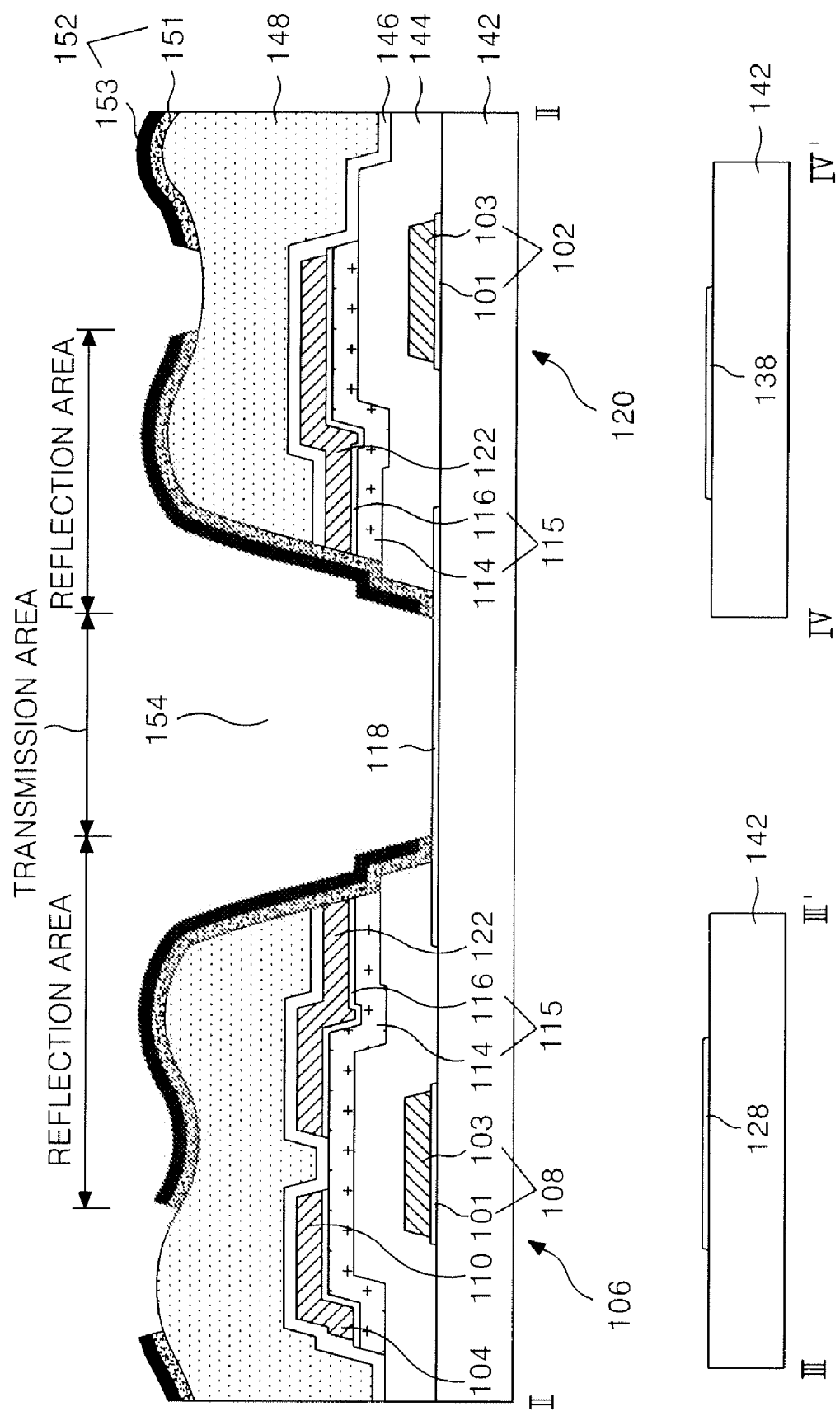

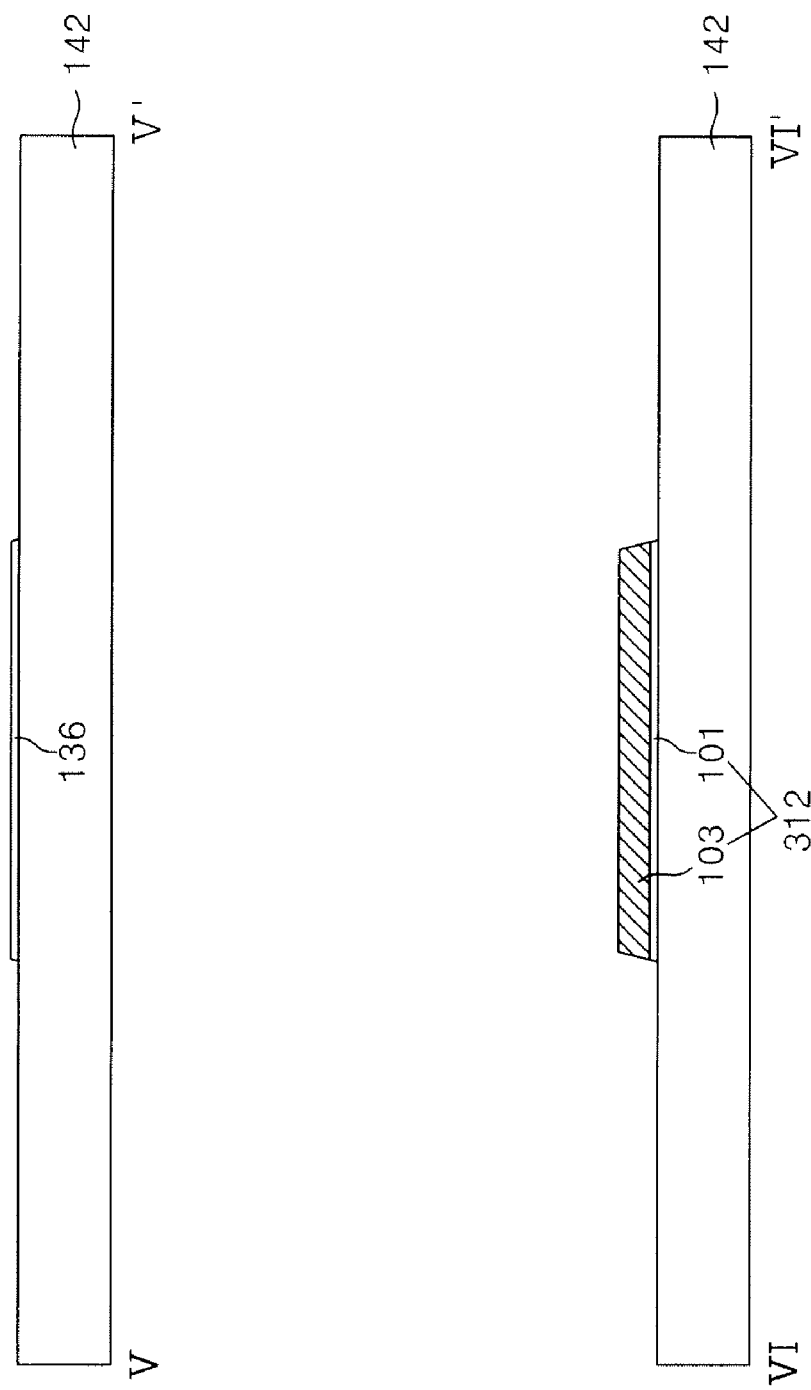

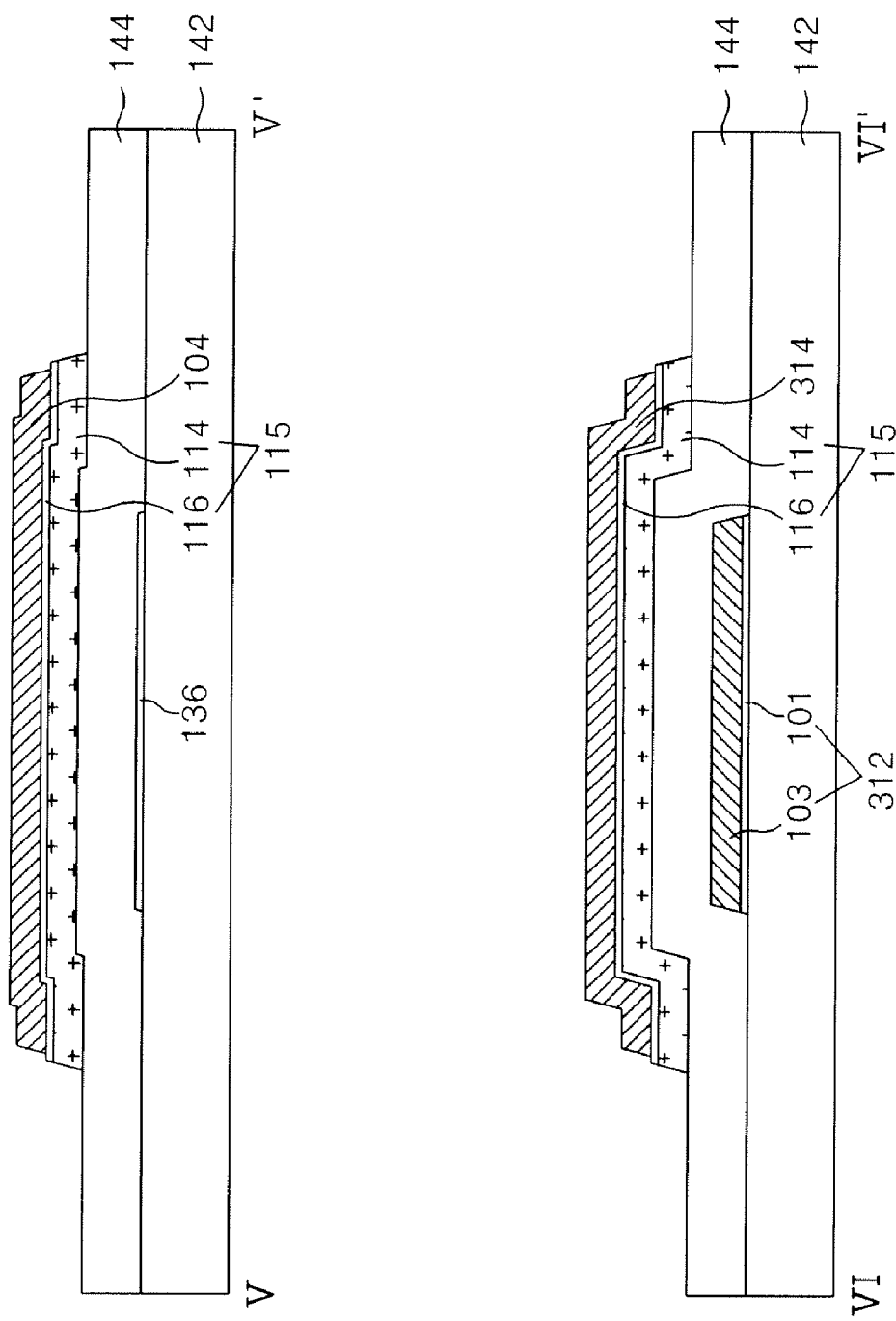

TRANSFLECTIVE LIQUID CRYSTAL DISPLAY DEVICE

This application is a divisional application of U.S. patent application Ser. No. 11/143,658, filed on Jun. 3, 2005 now U.S. Pat. No. 7,760,309, which claims the benefit of the Korean Patent Application No. P2004-41143, filed on Jun. 5, 2004, all of which are hereby incorporated by reference for all purposes as if fully set forth herein.

BACKGROUND OF THE INVENTION

1. Field of the Invention

The present invention relates to a transflective thin film transistor substrate of a liquid crystal display device, and more particularly, to a transflective thin film transistor substrate and a simplified method of fabricating the same.

2. Description of the Related Art

Liquid crystal display devices are generally classified into two types: the transmissive type in which pictures are displayed using light supplied from a backlight unit, and the reflective type in which pictures are displayed using light reflected from an external source, such as natural light. There is a problem that the power consumption of a backlight unit is high in the transmissive type and the reflective type depends on the external light so as not to be able to display the picture in a dark environment.

In order to resolve such a problem, a transflective liquid crystal display device is on the rise, wherein the transflective liquid crystal can be selected to be in a transmissive mode where the backlight unit is used or in a reflective mode where the external light is used. The transflective liquid crystal display device operates in the reflective mode if the external light is sufficient and in the transmissive mode if the external light is not sufficient, thus it might be able to reduce the power consumption more than the transmissive liquid crystal display device and it is not restricted by the external light, which is different from the reflective liquid crystal display device.

Generally, a transflective liquid crystal display panel, as shown in FIG. 1, includes a color filter substrate and a thin film transistor substrate which are bonded together with a liquid crystal layer (not shown) between them, and a backlight unit arranged behind the thin film transistor substrate. Each pixel of the transflective liquid crystal display panel is divided into a reflective area where a reflective electrode 28 is formed, and a transmissive area where the reflective electrode 28 is not formed.

The color filter substrate includes a black matrix (not shown) and a color filter 54 formed on an upper substrate 52, and a common electrode 56 and an alignment film (not shown) formed there over.

The thin film transistor substrate includes a gate line 4 and a data line (not shown) formed on a lower substrate 2 that define each pixel area; a thin film transistor connected to the gate line 4 and the data line; a pixel electrode 32 formed at the pixel area and connected to the thin film transistor; and a reflective electrode 28 formed at a reflective area of each pixel to overlap the pixel electrode 32.

The thin film transistor includes a gate electrode 6 connected to the gate line 4; a source electrode 16 connected to the data line; a drain electrode 18 facing the source electrode 16; an active layer that overlaps the gate electrode 6 with a gate insulating film 8 there between to form a channel between the source and drain electrodes 16, 18; and an ohmic contact layer 12 to cause the active layer 10 to be in ohmic-contact with the source and drain electrodes 16 and 18. The thin film transistor responds to a scan signal of the gate line 4 to cause a video signal on the data line to be charged and maintained in the pixel electrode 32.

The reflective electrode 28 reflects an external light that is incident through a color filter substrate, toward the color filter substrate. The surface of the organic film 24 formed under the reflective electrode 28 has an embossed or raised shape, therefore the reflective electrode 28, which is formed on top of the organic film, also has an embossed shape. As a result, the reflective efficiency of the reflective electrode 28 increases due to the dispersion effect of the embossed surface.

When a pixel signal is applied to the pixel electrode 32 through the thin film transistor, a potential difference between a common electrode 56 and the pixel electrode 28 is generated. The potential difference causes a liquid crystal having dielectric anisotropy to rotate, thereby controlling the transmissivity of the light that runs through the liquid crystal layer in both the reflective and transmissive areas, thus its brightness is changed in accordance with the video signal.

In this case, a transmission hole 36 is formed in a relatively thick organic film 24 at a transmissive area so that the length of the light path going through the liquid crystal layer is the same in the reflective area as in the transmissive area. As a result, the length of the path RL that ambient light incident to the reflective area travels is the same as the length of the path TL that transmitted light from the backlight unit 60, thus the transmissive efficiency is the same in both the reflective and transmissive modes.

The thin film transistor substrate further includes a storage capacitor connected to the pixel electrode 32 in order to stably maintain the video signal supplied to the pixel electrode 32. The storage capacitor is formed by having a storage upper electrode 20 overlap the gate line 4 with a gate insulating film there between, wherein the storage upper electrode 20 is connected to the pixel electrode 32. The ohmic contact layer 12 and the active layer 10 further overlap under the storage upper electrode 20 in the process.

The thin film transistor substrate further includes a first passivation film 22 between the thin film transistor and the organic film 24; a second passivation film between the organic film 24 and the reflective electrode 28; and a third passivation film 30 between the reflective electrode 28 and the pixel electrode 32. Accordingly, the pixel electrode 32 is connected to the drain electrode 18 and the storage upper electrode 20 through each of the first and second contact holes 34, 38 that penetrate the first to third passivation films 22, 26, 30, an organic film 24 and the reflective electrode 28.

In such a transflective liquid crystal display panel, the thin film transistor substrate includes the semiconductor process and requires a plurality of mask processes, thus its manufacturing process is complicated so that it becomes a material cause for the increase of the liquid crystal display panel manufacturing cost. Hereinafter, a fabricating method of the transflective thin film transistor substrate will be described in reference with FIGS. 2A to 2F.

Referring to FIG. 2A, a gate metal layer is formed on the lower substrate 2 using a deposition method such as sputtering. Subsequently, the gate metal layer is patterned with a first mask using a photolithography process and an etching process, thereby forming the gate pattern including the gate line 4 and the gate electrode 8. The gate metal layer is a single layered or double layered metal such as Al, Mo, Cr and the like.

Next, the gate insulating film 8 is formed on the substrate 2 where the gate pattern is formed, and a source/drain pattern is formed on top thereof using a second mask process as illustrated in FIG. 2B The source/drain pattern includes the data line, the source electrode 16, the drain electrode 18 and the storage upper electrode 20

The gate insulating film 8, an amorphous silicon layer 10, an amorphous silicon layer with impurities doped thereto 12, and the source/drain metal layer are sequentially formed on the lower substrate 2 where the gate pattern is formed. The gate insulating film 8 is an inorganic insulating material such as silicon oxide SiOx or silicon nitride SiNx, and the source/drain metal layer is a single or double layered metal structure such as Al, Mo and the like.

A photo resist pattern is formed on top of the source/drain metal layer using a second mask and a photolithography process. During this process, a diffractive exposure mask with a diffractive exposure part at a channel part of the thin film transistor is used as the second mask, thus the photo resist pattern of the channel part is made to have a lower height than the source/drain pattern part.

There after, the source/drain metal layer is patterned by wet etching using the photo resist pattern to form the source/drain pattern that includes the data line, the source electrode 16, the drain electrode 18 integrated with the source electrode 16, and the storage upper electrode 20.

Next, an amorphous silicon layer doped with the impurities and an amorphous silicon layer are simultaneously patterned by a dry etching using the same photo resist pattern, thereby forming the ohmic contact layer 12 and the active layer 10.

After removing the photo resist pattern having relatively low height at the channel part by ashing, the source/drain pattern and the ohmic contact layer 12 of the channel part are dry etched. Accordingly, the active part 10 of the channel part is exposed to separate the source electrode 16 from the drain electrode 18. There after, the photo resist pattern remaining on the source/drain pattern is removed using a strip process.

Referring to FIG. 2C, a first passivation film 22 is formed on the gate insulating film 8 where the source/drain pattern is formed, and an organic film 24 is formed on top thereof using a third mask process, such that the organic film 24 has first and second initial contact holes 34, 38 and a transmission hole 36 with an embossed shaped surface.

The first passivation film 22 and the organic film 24 are sequentially formed on the gate insulating film 8 where the source/drain pattern is formed. The first passivation film 22 is of the same inorganic insulating material as the gate insulating film 8, and the organic film 24 is of a photosensitive organic material such as acrylic resin.

Then, the organic film 24 is patterned using the third mask, thereby forming first and second open holes 35, 37 and the transmission hole 36 which penetrate the organic film 24 in correspondence to the transmissive part of the third mask. The third mask has a structure where a shielding part and a diffractive exposure part repeat at the rest area except for the transmissive part. The organic film 24 remaining in correspondence thereto is patterned to have a structure that a shielding area (projected part) and a diffractive exposure area (groove part) having a stepped difference are repeated. Subsequently, the organic film 24 where the projected part and the groove part are repeated is cured so that the surface of the organic film 24 has the embossed shape.

Referring to FIG. 2D, a second passivation film 26 is formed on the organic film 24, and the reflective electrode 28 is formed on top thereof using a fourth mask process. The second passivation film 26 and the reflective metal layer are deposited to maintain their embossed shape on top of the organic film 24 that has the same embossed surface. The second passivation film 26 is an inorganic insulating material such as the first passivation film 22, and the reflective metal layer is a metal with high reflectivity such as AlNd.

Subsequently, the reflective metal layer is patterned using a fourth mask and etching process, thus the reflective electrode 28 is formed, wherein the reflective electrode is independent every pixel and is opened at the transmission hole 36 and the first and second open holes 35, 37 of the organic film 24.

Referring to FIG. 2E, a third passivation film 30 covering the reflective electrode 28 is formed using a fifth mask process, and first and second contact holes 34, 38 penetrating the first to third passivation films 22, 26, 30 are formed. The third passivation film 30 the reflective electrode 28 and the first and second contact holes 34, 38 are formed with the fifth mask using photolithography and etching processes, such that the first and second contact holes 34, 38 penetrate the first to third passivation films 22, 26, 30 at the first and second open holes 35, 37 of the organic film 24. The first and second contact holes 34, 38 each expose the drain electrode 18 and the storage upper electrode 20. The third passivation film is of the same inorganic insulating material as the second passivation film.

Referring to FIG. 2F, a pixel electrode 32 is formed on the third passivation film 30 by use of a sixth mask process. More specifically, a transparent conductive layer is formed on the third passivation film 30 using a deposition method such as sputtering, and the transparent conductive layer is patterned by the photolithography process using a sixth mask and the etching process to form the pixel electrode at each pixel area. The pixel electrode 32 is connected to the drain electrode 18 and the storage upper electrode 20 through the first and second contact holes 34 and 38. The transparent conductive layer is of indium tin oxide ITO.

Accordingly, the related art transflective thin film transistor substrate is formed using six 6 different mask processes, thus there is a disadvantage that its manufacturing process is complicated. Further, the margin of the first and second contact holes 34, 38 should be secured sufficiently in order for the pixel electrode 32 to be connected to the drain electrode 18 and the storage upper electrode 20 in the related art transflective thin film transistor substrate. Because of this, there is a disadvantage that the aperture ratio of the transmissive area is reduced.

SUMMARY OF THE INVENTION

Accordingly, the present invention is directed to a liquid crystal display device and method of fabricating same that substantially obviates one or more of the problems due to limitations and disadvantages of the related art.

An advantage of the present invention is to provide a transflective thin film transistor substrate with an improved aperture ratio and a simplified method of fabricating the same.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device, is provided, comprising: first and second substrates; a gate line having a double layer structure including a first transparent conductive layer and a second opaque conductive layer on the first substrate; a first insulation layer on the gate line; a data line crossing the gate line to define a pixel region, the pixel region having a transmissive region and a reflective region; a thin film transistor connected to the gate and data lines; a pixel electrode formed of the transparent conductive layer in the pixel region; an upper storage electrode to form a storage capacitor by overlapping the gate line with the gate insulating film there between; a transmission hole exposing the pixel electrode by passing through a second insulation layer on the thin film transistor to the first insulation layer; a reflective electrode connected to the pixel electrode with a drain electrode and the upper storage electrode exposed through an edge part of the transmission hole; a gate pad extending from the first conductive layer of the gate line; a data pad formed of the first conductive layer and connected to the data line through a data link; and a liquid crystal layer between the first and second substrates; wherein the first and second insulation layers are removed in the gate and data pads.

In another aspect of the invention, a method of fabricating a liquid crystal display device, is provided, comprising: providing first and second substrates; forming a gate line and a gate electrode having a double layer structure including a first transparent conductive layer and a second opaque conductive layer, and a pixel electrode having the first conductive layer using a first mask; forming a first insulation layer on the electrodes; forming a semiconductor pattern on the first insulation layer, a source/drain pattern having an upper storage electrode, a drain electrode, a source electrode, and a data line using a second mask, the gate and data lines defining a pixel region having a transmissive region and a reflective region; forming a second insulation layer on the source/drain pattern and a transmission hole penetrating from the second insulation layer to the first insulation layer in the transmissive region using a third mask; forming a reflective electrode in the reflective region using a fourth mask, the reflective electrode connecting the pixel electrode with the drain electrode and the storage electrode through the transmission hole; and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 4 is a sectional view illustrating the transflective thin film transistor substrate of FIG. 3, taken along the line II-II', III-III, IV-IV';

FIGS. 5A and 5B illustrate a plane view and a sectional view, respectively, of a first mask process utilized in fabricating a transflective thin film transistor substrate according to an embodiment of the present invention;

FIGS. 6A to 6E are sectional views more specifically illustrating the first mask process according to the present invention;

FIGS. 8A to 8E are sectional views more specifically illustrating the second mask process of the present invention;

FIGS. 9A and 9B illustrate a plane view and a sectional view, respectively, of a third mask process utilized to fabricate a transflective thin film transistor substrate according to an embodiment of the present invention;

FIGS. 10A to 10C are sectional views more specifically illustrating the third mask process of the present invention;

FIGS. 11A and 11B illustrate a plane view and a sectional view, respectively, of a fourth mask process utilized to fabricate a transflective thin film transistor substrate according to an embodiment of the present invention;

FIGS. 15A and 15B illustrate a plane view and a sectional view, respectively, of a first mask process utilized to fabricate the transflective thin film transistor substrate of FIG. 14;

FIGS. 16A and 16B illustrate a plane view and a sectional view, respectively, of a second mask process utilized to fabricate the transflective thin film transistor substrate of FIG. 14;

DETAILED DESCRIPTION OF THE ILLUSTRATED EMBODIMENTS

Reference will now be made in detail to embodiments of the present invention, examples of which are illustrated in the accompanying drawings.

Figure 1:
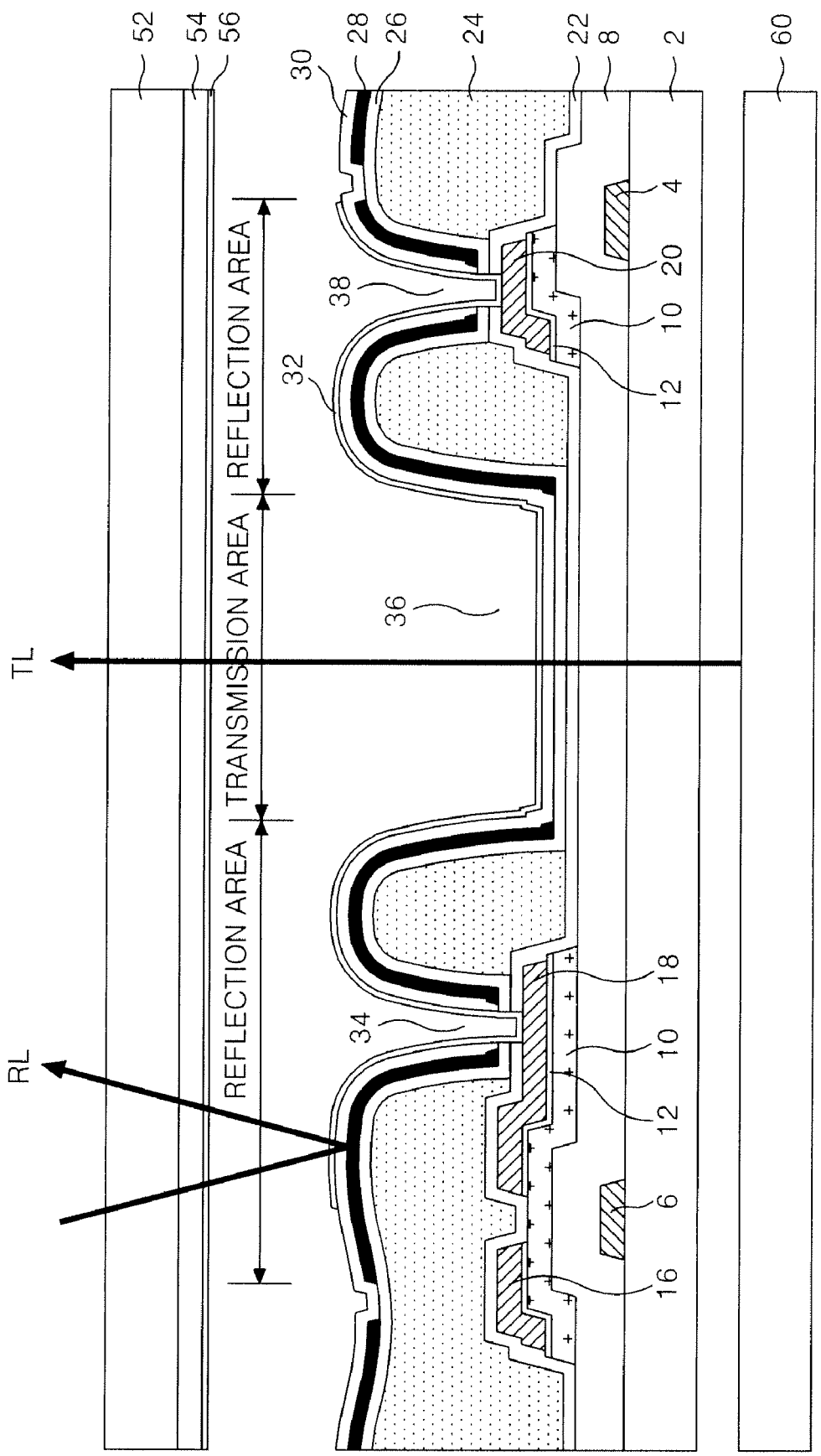
FIG. 1 is a sectional view illustrating part of a transflective liquid crystal display panel according to the related art.
Figure 2A:
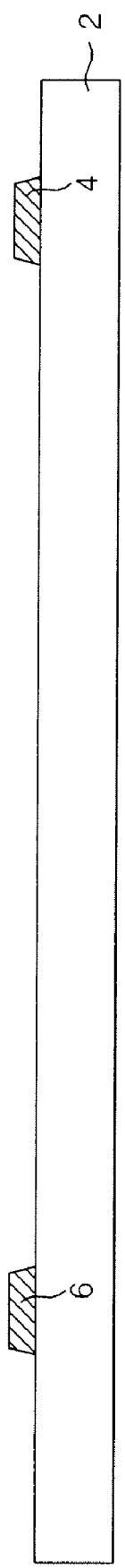
FIGS. 2A to 2F are sectional views illustrating a method of fabricating the transflective thin film transistor substrate illustrated in FIG. 1.
Figure 2B:
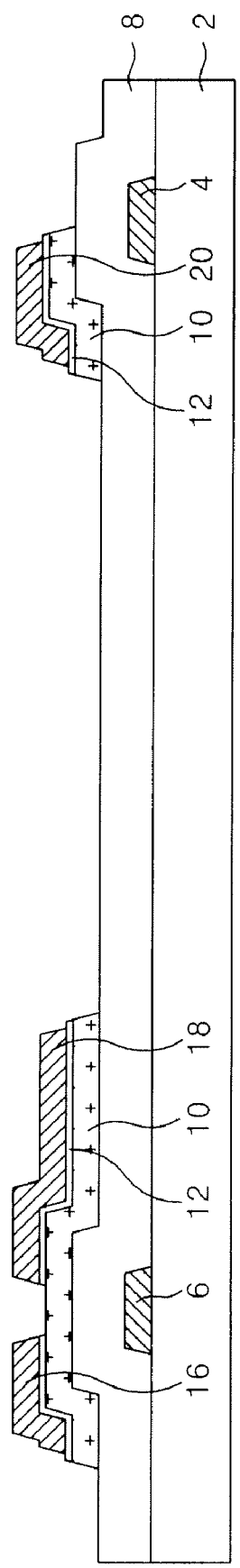
Figure 2C:
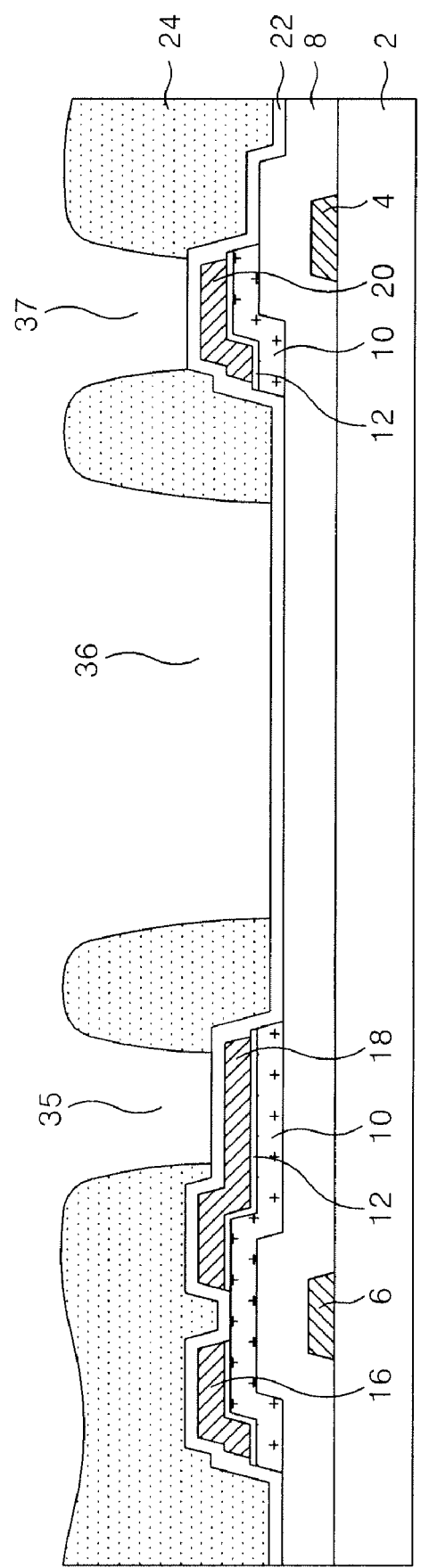
Figure 2D:
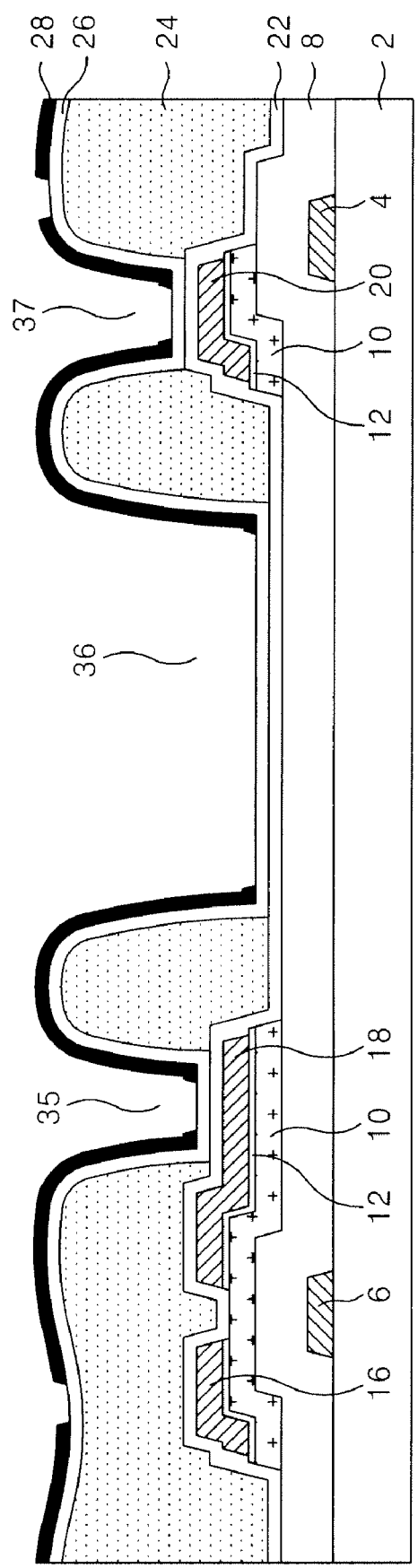
Figure 2E:
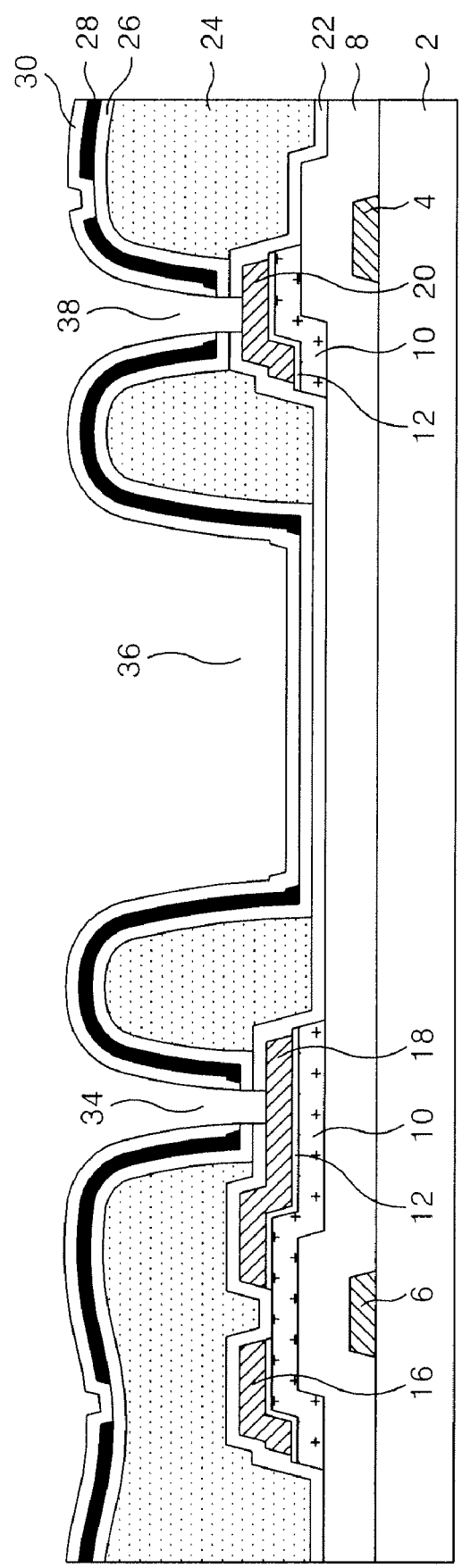
Figure 2F:
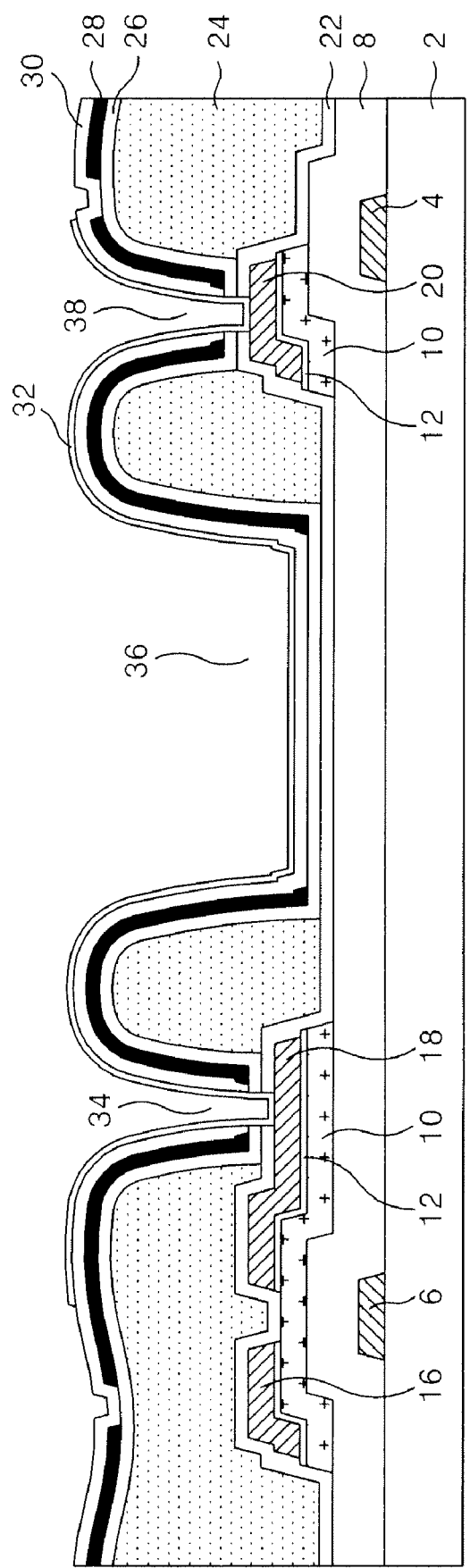
Figure 3:
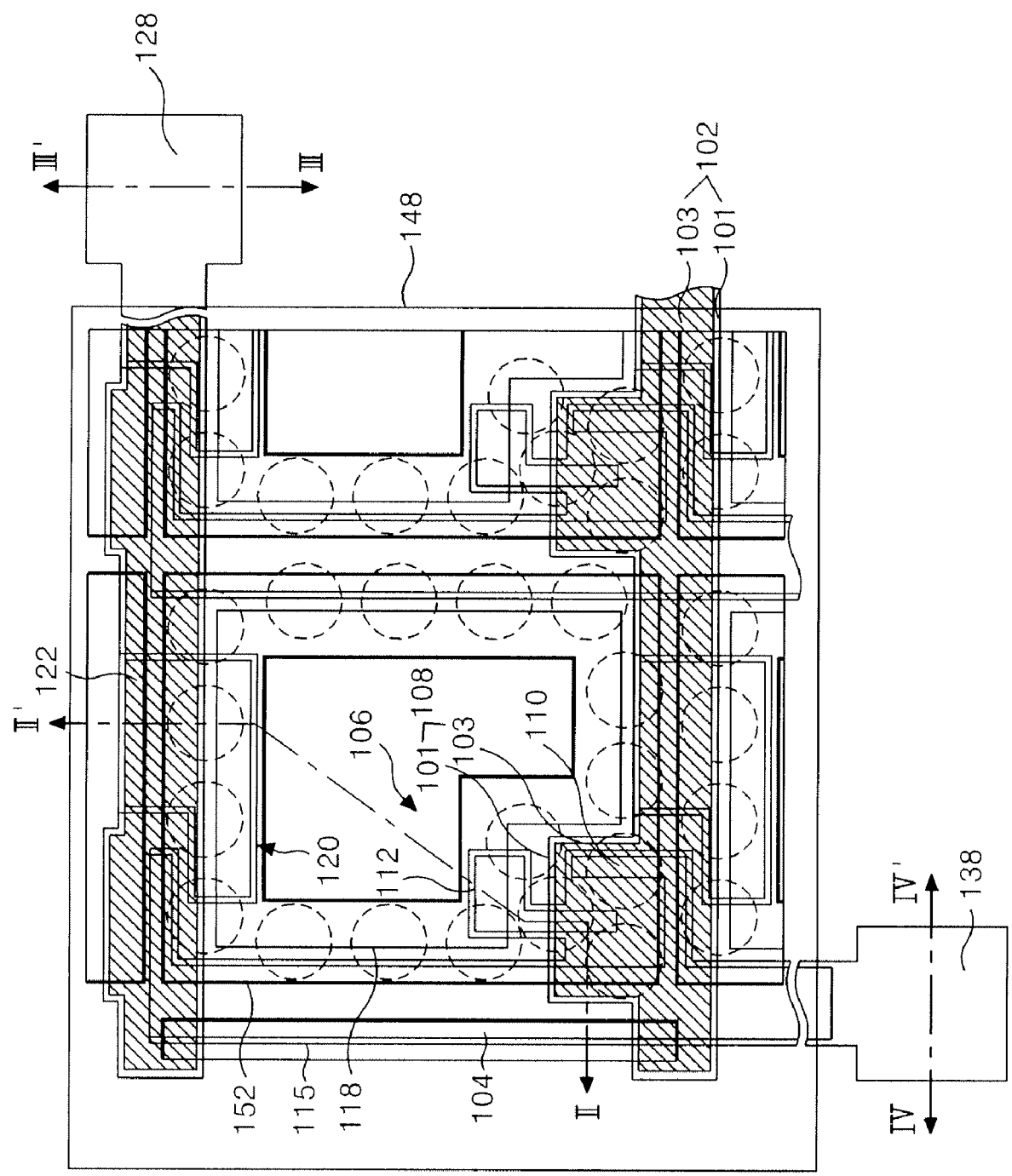
FIG. 3 is a plane view partially illustrating a transflective thin film transistor substrate according to an embodiment of the present invention.

FIG. 3 is a plane view partially illustrating a transflective thin film transistor substrate according to an embodiment of the present invention, and FIG. 4 is a sectional view illustrating the transflective thin film transistor substrate of FIG. 3 taken along the line II-II, III-III', IV-IV'.

Referring to FIGS. 3 and 4, the transflective thin film transistor substrate includes: a gate line 102 and a data line 104 that define a pixel area on a lower substrate 142 by crossing each other with a gate insulating film 144 there between; a thin film transistor 106 connected to the gate line 102 and the data line 104; a reflective electrode 152 formed in a reflective area of each pixel; and a pixel electrode 118 formed in each pixel area and connected to the thin film transistor 106 through the reflective electrode 152. The transflective thin film transistor substrate also includes: a storage capacitor 120 that is formed by the overlapping of the previous gate line 102 and an upper storage electrode 122 connected to the pixel electrode 118 through a reflective electrode 152; a gate pad 128 connected to the gate line 102; and a data pad 138 connected to the data line 104. Each pixel area is divided into a reflective area where the reflective electrode 152 is formed and a transmissive area where the reflective electrode 152 is not formed.

The thin film transistor 106 includes: a gate electrode 108 connected to the gate line 102; a source electrode 110 connected to the data line 104; a drain electrode 112 facing the source electrode 110; an active layer 114 overlapping the gate electrode 108 with a gate insulating film 144 there between to form a channel between the source electrode 110 and the drain electrodes 112; and an ohmic contact layer 116 formed on the active layer 114 except for the channel part to make an ohmic contact with the source electrode 110 and the drain electrodes 112. The thin film transistor 106 responds to the scan signal of the gate line 102 to cause a video signal on the data line 104 to be charged and maintained in the pixel electrode 118.

As illustrated in FIG. 4, the gate line 102 and the gate electrode 108 have a double layer structure including a first conductive layer 101 and a second conductive layer 103. For example, the first conductive layer is a transparent conductive layer and the second conductive layer 103 is a metal layer deposited on top thereof.

In addition, the semiconductor pattern 115, including the active layer 114 and the ohmic contact layer 116, overlaps the data line 104.

The reflective electrode 152 is formed in the reflective area of each pixel to reflect an external light. The reflective electrode 152 has an embossed shape in accordance with the shape of the organic film 148 there under, thus its reflection efficiency increases due to the dispersion effect. The reflective electrode 152 has a double layer structure including first and second reflective metal layers 151 and 153. The first reflective metal layer 151 is formed of a metal, such as Mo, capable of reducing contact resistance between the reflective pixel and the pixel electrode 118, which is formed of a transparent conductive layer. The second reflective metal layer is formed of a metal, such as AlNd and the like, with a high reflectibility.

The pixel electrode 118 is formed in each pixel area and connected to the drain electrode 112 through the reflective electrode 152 that goes through an edge part of a transmission hole 154. The pixel electrode 118 is formed of a transparent conductive layer like the first conductive layer 101 of the gate line 102 and is exposed through the transmission hole 154 in the transmissive area. The pixel electrode 118 generates a potential difference with a common electrode of a color filter substrate (not shown) in accordance with a pixel signal supplied through the thin film transistor. The potential difference causes the liquid crystal having dielectric anisotropy to rotate, thereby controlling the transmissivity of the light through the liquid crystal layer, thus its brightness is changed in accordance with the video signal.

The transmission hole 154 formed in the transmissive area penetrates the gate insulating film 144 over a portion of the pixel electrode 118, and the passivation film 146, the organic film 148 on the thin film transistor 106. Accordingly, the length of the light path that runs through the liquid crystal layer is the same in the reflective area and the transmissive area, thus the transmission efficiency of the reflective mode and the transmissive mode is the same.

The upper storage electrode 122 overlaps the previous gate line 102 with the gate insulating film 144 there between, and connects to the pixel electrode 118 through the reflective electrode, thereby forming the storage capacitor 120. The gate line 102 is connected to a gate driver (not shown) through the gate pad 128. The first conductive layer 101 of the gate line 102 is extended to form the gate pad 128.

The data line 104 is connected to a data driver (not shown) through the data pad 138. The data pad 138 is formed of the first conductive layer 101 like the gate pad 128. The data pad 138 is connected to the data line 104 through a separate contact electrode (not shown).

In the pad area having the gate pad 128 and the data pad 138, the gate insulating film 144, the passivation film 146 and the organic film 148 are removed.

The transflective thin film transistor substrate according to the embodiment of the present invention has the pixel electrode 118 connected to the drain electrode 112 and the upper storage electrode 122 through the reflective electrode 152 that runs through the edge part of the transmission hole 154. Accordingly, it is not necessary to have a separate contact hole for connecting the pixel electrode 118 with the drain electrode 112 and the upper storage electrode 122, thus the aperture ratio of the transmissive area is increased.

In addition, the first reflection metal layer 151 of the reflective electrode 152 is connected to the pixel electrode 118, wherein the first reflection metal layer has a small contact resistance with the transparent conductive layer. Accordingly, AlNd and ITO are connected through Mo in case that Mo is used for the first reflective electrode 151, AlNd is used for the second reflection layer 153 and ITO is used for the pixel electrode 118, thus the contact resistance of AlNd and ITO caused by the generation of $Al_2O_3$ is reduced.

The thin film transistor according to the embodiment of the present invention may be formed using a five mask processes, thereby simplify the fabrication process compared to the related art six mask process.

Figure 5B:
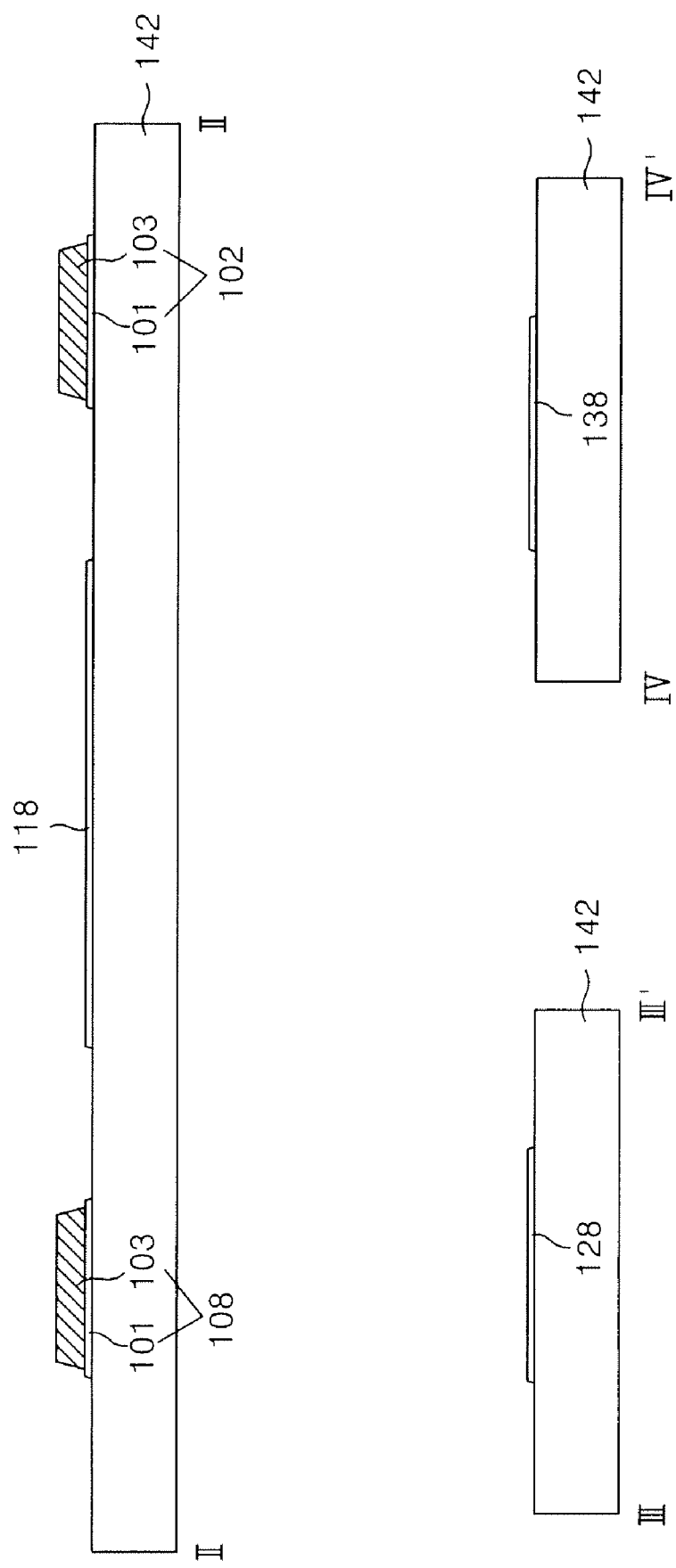
Figure 6A:
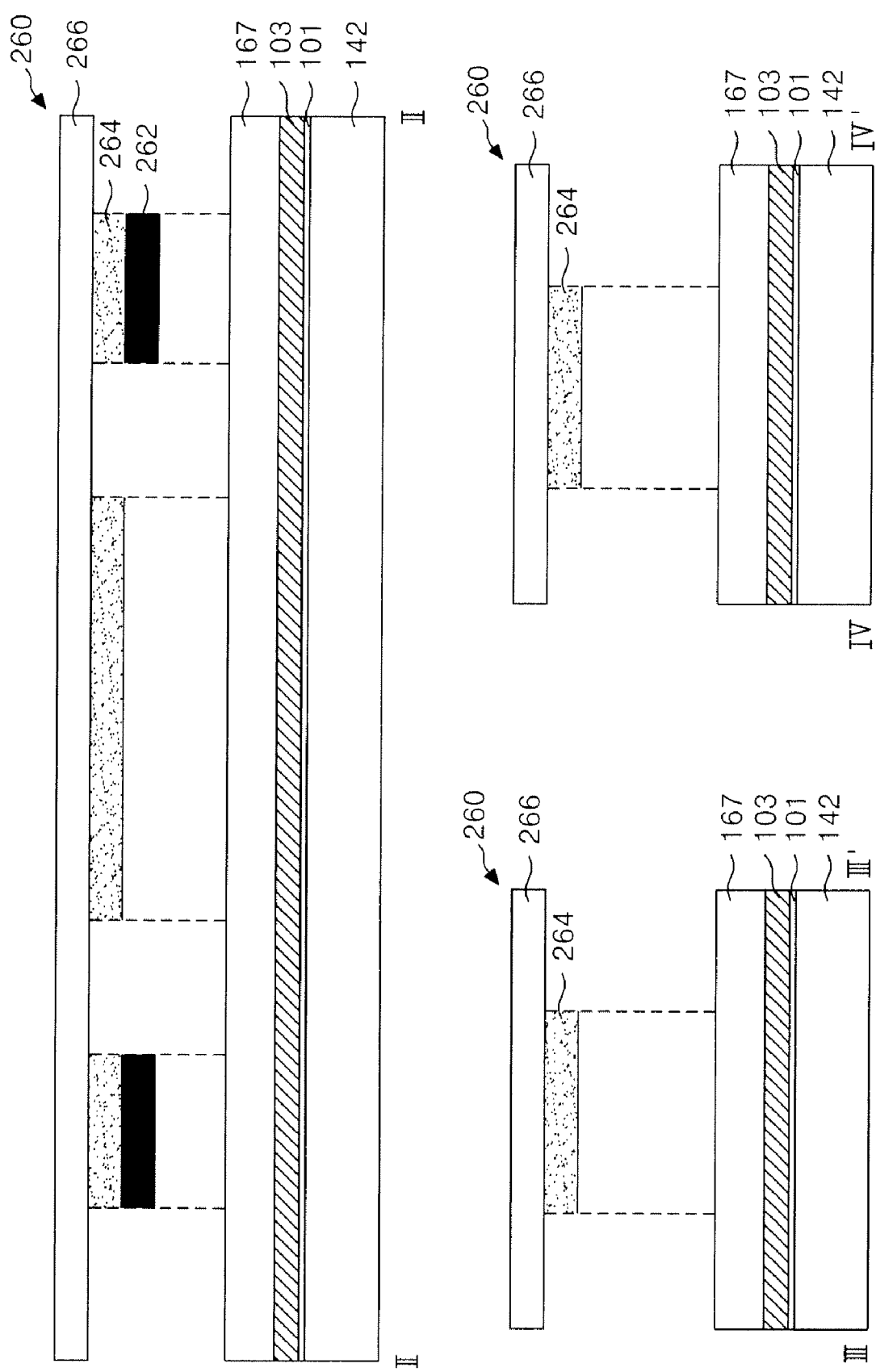

FIGS. 5A and 5B illustrate a plane view and a sectional view, respectively, of a first mask process utilized in fabricating the transflective thin film transistor substrate according to the present invention, and FIGS. 6A and 6E are sectional views more specifically illustrating the first mask process of the present invention.

As illustrated in FIG. 5B, a gate pattern and a transparent conductive pattern are formed on the lower substrate 142 using a first mask process. The gate pattern includes a gate line 102, a gate electrode 108 connected to the gate line 102, and the transparent conductive pattern includes a gate pad 128, a data pad 138 and a pixel electrode 118. The gate pattern has a double layer structure including first and second conductive layers 101, 103. The transparent conductive pattern has a single layer structure formed of the same material as the first conductive layer 101 of the gate pattern. The gate pattern having the double structure and the transparent conductive pattern having the single layer structure are formed use a half-tone mask or a diffractive mask using one mask process. Hereinafter, only an example for using the half-tone mask will be described.

As illustrated in FIG. 6A, the first and second conductive layers 101, 103 are deposited on the lower substrate 142 using a deposition method such as sputtering, and a photo-resist 167 is formed on the first and the second conductive layer 101 and 103. The first conductive layer 101 is formed of a transparent conductive material such as ITO, TO, IZO and the like, and the second conductive layer 103 is formed of a metal material such as Mo, Ti, Cu, Al(Nd) system and the like. Then, the photo-resist 167 is exposed and developed using a photolithography process with a half-tone mask 260, to form a photo-resist pattern 168 having a stepped difference as illustrated in FIG. 6B.

The half-tone mask 260 includes a transparent quartz substrate 266, a shielding layer 262 formed on transparent quartz substrate 266, and a partial transmissive layer 264. The shielding layer 262 overlaps the partial transmission layer 264 located in the area where the gate pattern is to be formed, to intercept ultraviolet ray, thereby leaving a first photo-resist pattern 268A after development. The partial transmissive layer 264 not overlapped by the shielding layer 262 is located in the area where the transparent conductive pattern is to be formed, to transmit partially ultraviolet ray, thereby leaving a second photo-resist pattern 268B thinner than the first photo-resist pattern 268A after development. The shielding layer 262 is formed of a metal such as Cr, CrOx and the like, and the partial transmissive layer 264 is formed of MoSix and the like.

The first and the second conductive layers 101 and 103 are then patterned by etching the conductive layers using the photo resist patterns 268A and 268B having a stepped difference, thereby forming the gate pattern of the double layer structure and the transparent conductive pattern on which the second conductive layer 103 is remained, as illustrated in FIG. 6C. Then, the photo resist pattern 268 is ashed using oxygen $O_2$ plasma. As a result, the first photo-resist pattern 268A becomes thinner and the second photo-resist pattern 268B is removed, as illustrated in FIG. 6D. The second conductive layer 103 on the transparent conductive layer is removed by an etching process using the ashed first photo-resist pattern 268A. At this moment, both sides of the second conductive layer 103 are etched once more along the ashed first photo-resist pattern 268A, thus the first and the second conductive layers 101 and 103 of the gate pattern have a fixed stepped difference in a step shape. Accordingly, when a lateral surface part of the first and the second conductive layers 101 and 103 has a high steep inclination, it is possible to prevent an open defect of the source/drain metal layer from being generate on the first and the second conductive layers 101 and 103. The first-photo resist pattern 268A remaining on the gate pattern is then removed using a strip process as illustrated in FIG. 6E.

Figure 7A:
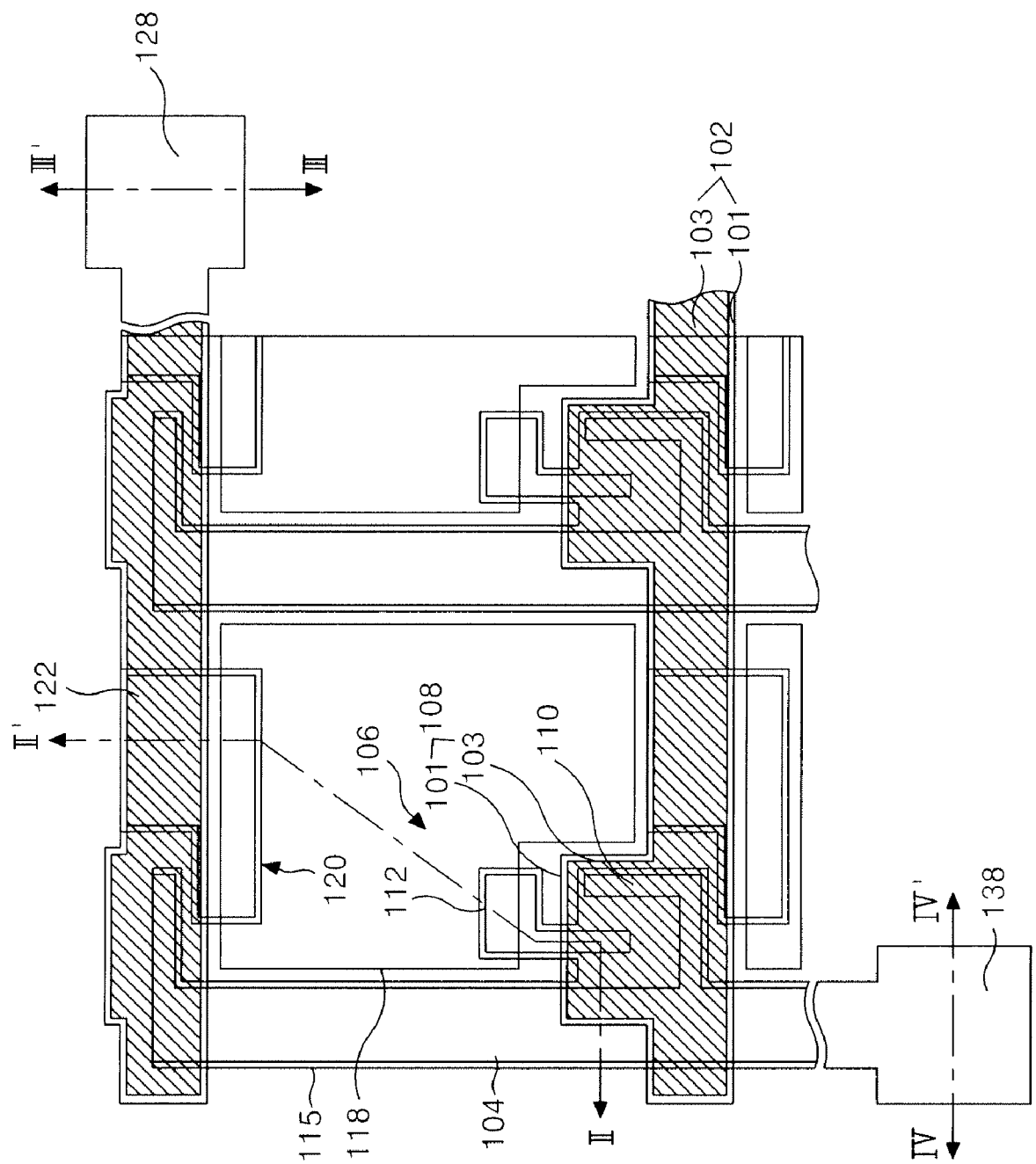
FIGS. 7A and 7B illustrate a plane view and a sectional view, respectively, of a second mask process utilized to fabricate a transflective thin film transistor substrate according to an embodiment of the present invention.
Figure 7B:
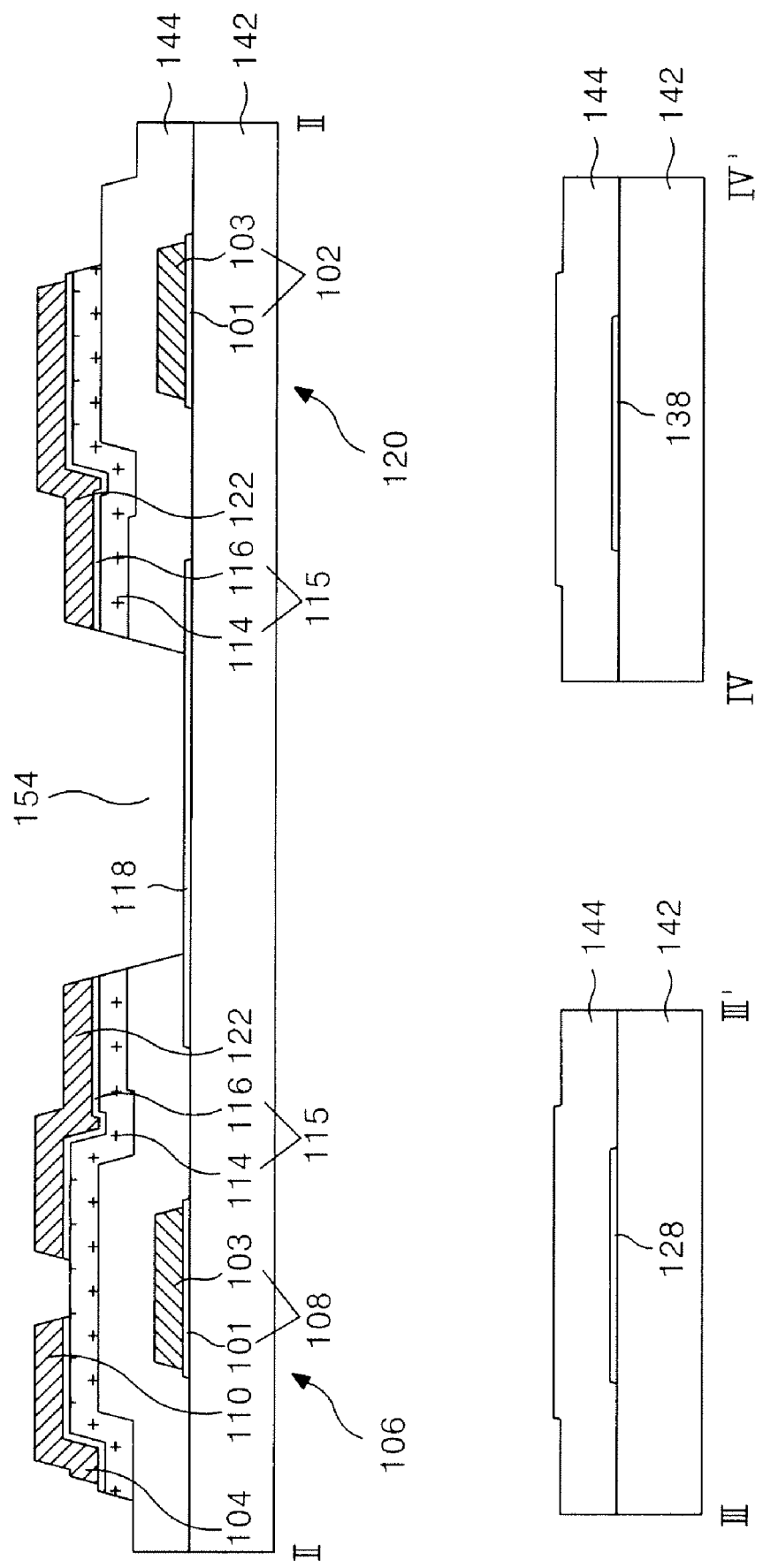

FIGS. 7A and 7B illustrate a plane view and a sectional view of a second mask process utilized in fabricating a transflective thin film transistor substrate according to the present invention, and FIGS. 8A to 8E are sectional views more specifically illustrating the second mask process.

Referring to FIG. 7B, a gate insulating film 144 is formed on the lower substrate 142 including where the gate pattern and the pixel electrode 118 are formed. In addition, a source/drain pattern and a semiconductor pattern 115 including the active layer 114 and the ohmic contact layer 116 that overlap along the rear surface of the source/drain pattern are formed on top thereof using a second mask process. The source/drain pattern includes a data line 104, a source electrode 110, a drain electrode 112, and an upper storage electrode 122. The semiconductor pattern 115 and the source/drain pattern are formed using a single mask process with, for example, a diffractive exposure mask.

More specifically, a gate insulating film 144, an amorphous silicon layer 105, an amorphous silicon layer 107 doped with impurities n+ or p+, and a source/drain metal layer 109 are sequentially formed on the lower substrate 142 including where the gate pattern is formed as illustrated in FIG. 8A. For example, the gate insulating film 144, the amorphous silicon layer 105, and the amorphous silicon layer 107 doped with impurities are formed by PECVD, and the source/drain metal layer 109 is formed by sputtering. The gate insulating film 144 is an inorganic insulating material such as silicon oxide SiOx, silicon nitride SiNx, and the source/drain metal layer 109 is formed of Cr, Mo, MoW, Al/Cr, Cu, Al(Nd), Al/Mo, Al(Nd)/Al, Al(Nd)/Cr, Mo/Al(Nd)/Mo, Cu/Mo, Ti/Al(Nd)/Ti and the like. For an example of the double layer, in case of Al/Cr, Al layer is formed after Cr layer is formed.

A photo-resist 219 is then spread over the source/drain metal layer 109, and exposed and developed using a photolithography process with a diffractive exposure mask 210, thereby forming a photo-resist pattern 220 having the stepped difference as illustrated in FIG. 8B.

The diffractive exposure mask 210 includes a transparent quartz substrate 212, a shielding layer 214 formed of a metal layer such as Cr, CrOx and the like on top thereof, and a diffractive exposure slit 216. The shielding layer 214 is located to intercept ultraviolet rays in the area where the semiconductor pattern and the source/drain pattern are to be formed, thereby leaving a first photo-resist pattern 220A after development. The diffractive exposure slit 216 is located to diffract ultraviolet rays in the area where the channel of the thin film transistor is to be formed, thereby leaving a second photo-resist pattern 220B that is thinner than the first photo-resist pattern 220A after development.

Subsequently, the source/drain metal layer 109 is patterned by etching the photo-resist pattern 220 having a stepped difference, thereby forming the source/drain pattern and the semiconductor pattern 115 there under as illustrated in FIG. 8C. At this point in the process, the source electrode 110 and the drain electrode 112 are integrated with each other.

Figure 8E:
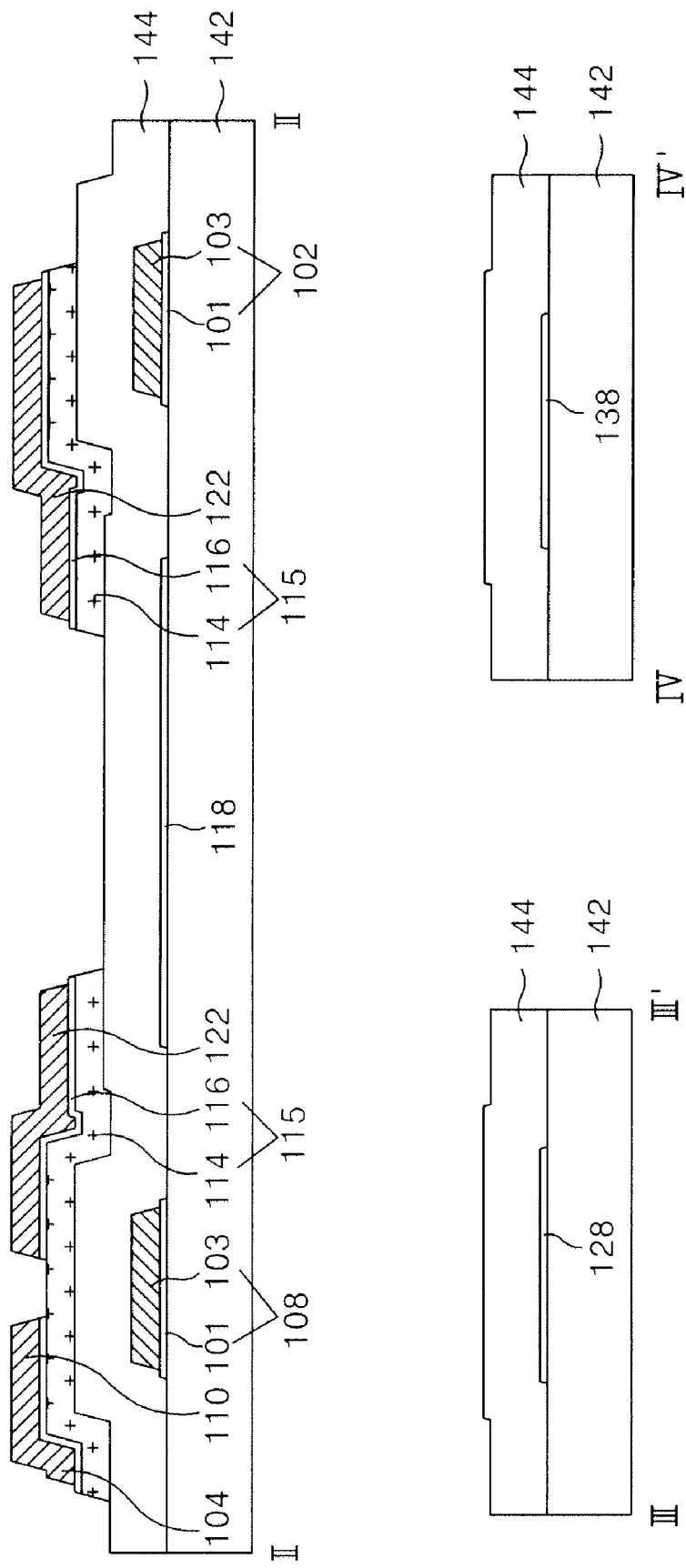

And then, the photo-resist pattern 220 is ashed using oxygen $O_2$ plasma. As a result, the first photo-resist pattern 220A becomes thinner and the second photo-resist pattern 220B is removed, as illustrated in FIG. 8D. In addition, the source/drain pattern exposed by the removal of the second photo-resist pattern 220B and the ohmic contact layer 116 there under are eliminated by the etching process using the ashed first photo-resist pattern 220A, thereby separating the source electrode 110 from the drain electrode 112 and exposing the active layer 114. Accordingly, a channel of the active layer 114 is formed between the source electrode 110 and the drain electrode 112. At this moment, both sides of the source/drain pattern are etched once more along the ashed first photo resist pattern 220A, thus the source/drain pattern and the semiconductor pattern 115 have a fixed stepped difference in a step shape. The first photo resist pattern 220A remaining on the source/drain pattern is removed using a strip process as illustrated in FIG. 8E.

Figure 9A:
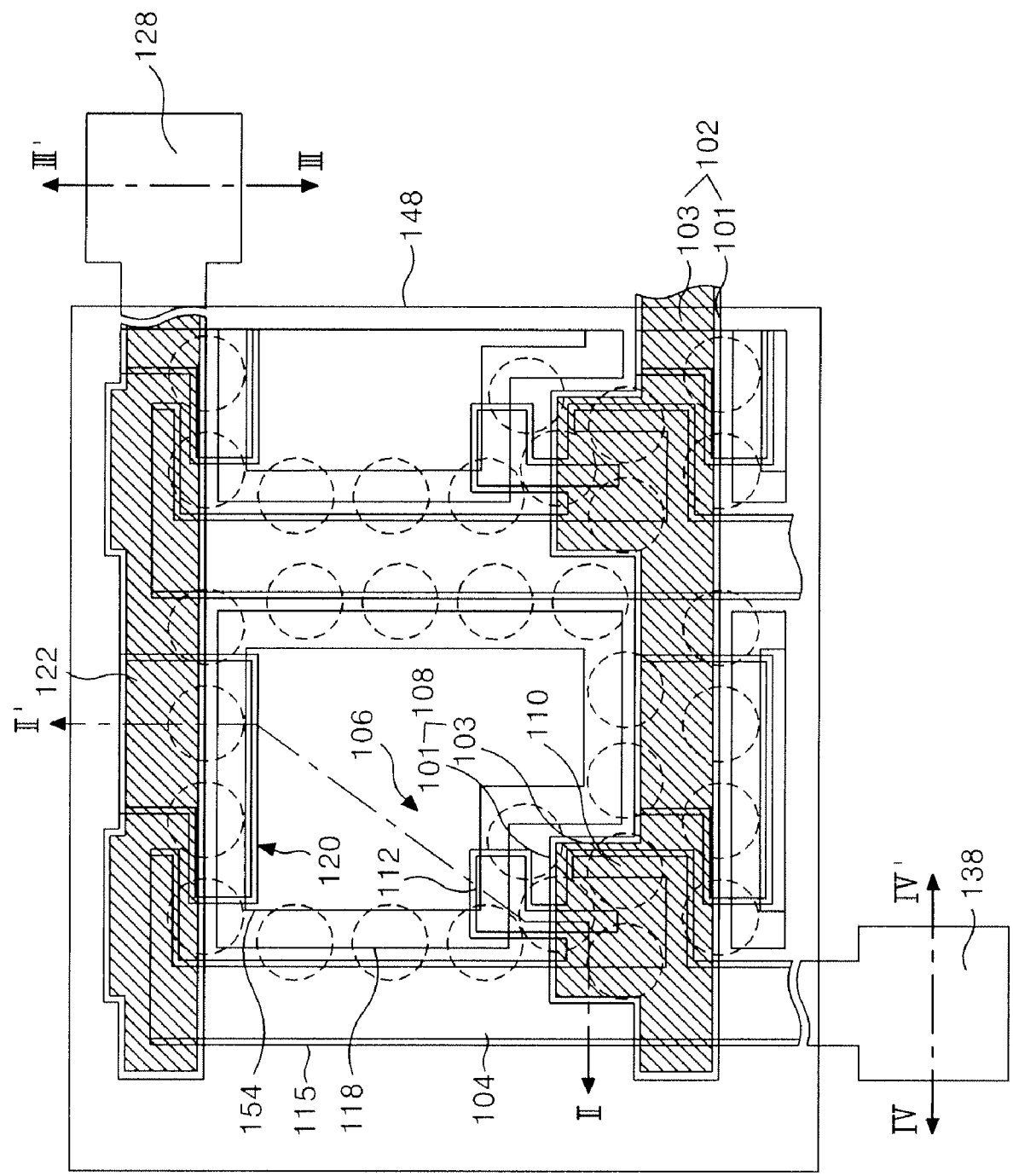
Figure 10C:
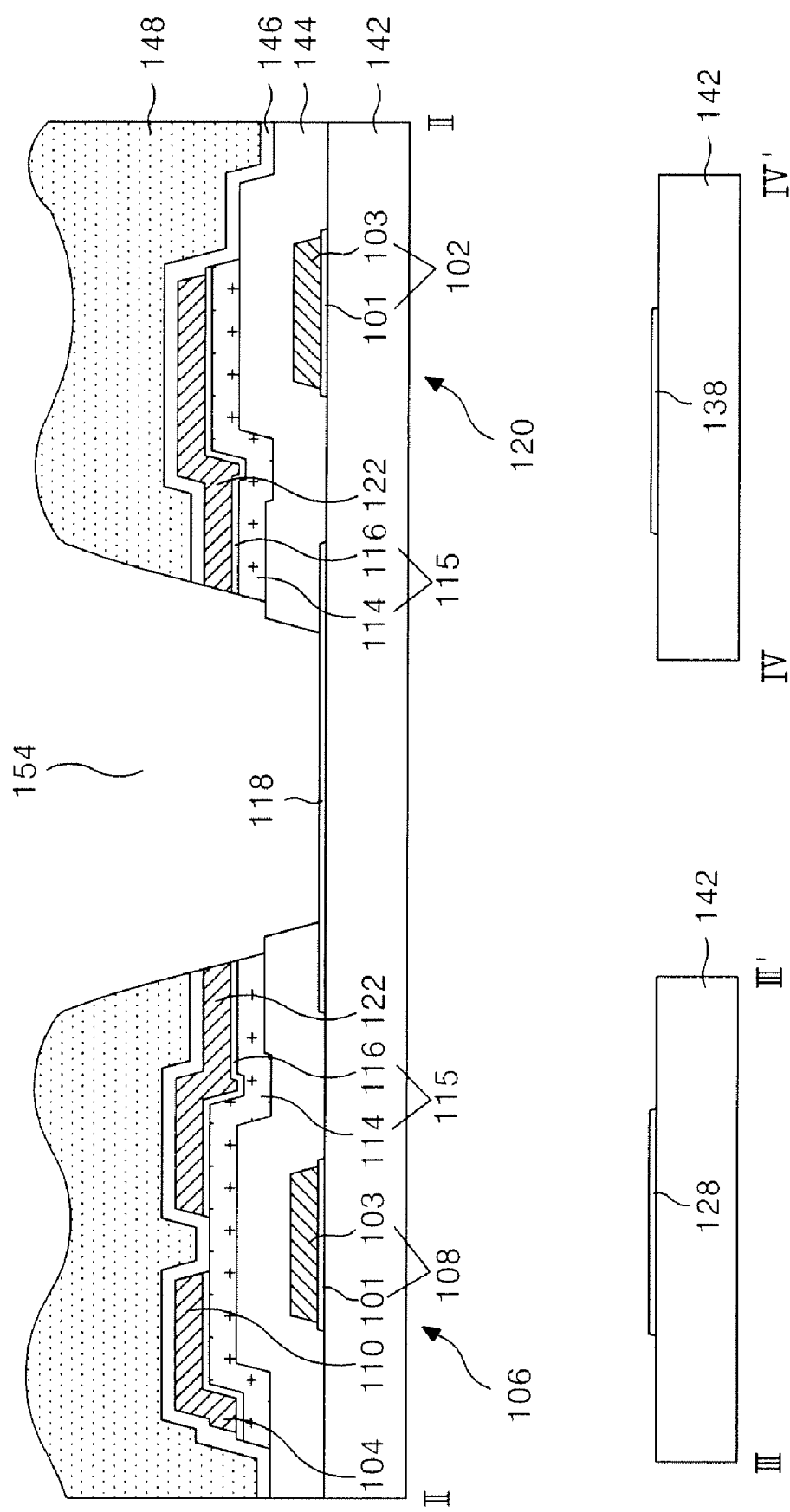

FIGS. 9A and 9B illustrate a plane view and a sectional view, respectively, of a third mask process utilized in fabricating a transflective thin film transistor substrate according to the present invention, and FIGS. 10A to 10C are sectional views sequentially illustrating the third mask process of the present invention.

Referring to FIG. 9B, a passivation film 146 and an organic film 148, having a transmission hole 154 in a transmissive area, are formed on the gate insulating film 144 having the source drain pattern using a third mask process.

More specifically, as illustrated in FIG. 10A, the passivation film 146 is formed on the gate insulating film 144 including where the source/drain pattern is formed using a deposition method such PECVD. The passivation film 146 is an inorganic insulating material like the gate insulating film 144. Then, the organic film 148 having an embossed surface in a reflective area and a transmission hole 154 in a transmissive area is formed on the passivation film 148 as illustrated in FIG. 10B.

The organic film 148 is formed on the passivation film 146 by coating a photosensitive organic material such as acrylic resin using a spin coating method. Then, the organic film 148 is patterned using a photolithography process with the third mask, thereby forming the transmission hole 154 which penetrates the organic film 148 in correspondence to the transmission part of the third mask and removing the organic film 148 of a pad area having the data pad 138. Further, the third mask has a structure where a shielding part and a diffractive exposure part (or a transflective part) repeat except in the transmission part. The organic film 24 in correspondence to the above repeat structure is patterned to have a structure that a shielding area (projected part) and a diffractive exposure area (groove part) having a stepped difference are repeated. Subsequently, the organic film 24 where the projected part and the groove part are repeated is fired so that the surface of the organic film 24 has an embossed shape.

Referring to FIG. 10C, the passivation film 146 and the gate insulating film 144 are patterned by using the organic film 148 as a mask, so that the transmission hole 154 penetrates to the gate insulating film 144, and the passivation film 146 and the gate insulating film 144 in the pad area are removed. In this case, the drain electrode 112, the upper storage electrode 122 and the semiconductor pattern under the upper storage electrode 122 that are exposed through the transmission hole 154 are etched. Due to a difference of etching speed, an edge part of the gate insulating film 144 has a projected structure as compared to the drain electrode 112, the upper storage electrode 122 and the semiconductor pattern under the upper storage electrode 122. The transmission hole 154 exposes the second conductive layer 103 of the pixel electrode 118, the edge part of the transmission hole 154 exposes a lateral surface of the drain electrode 112 and the upper storage electrode 122.

Figure 11A:
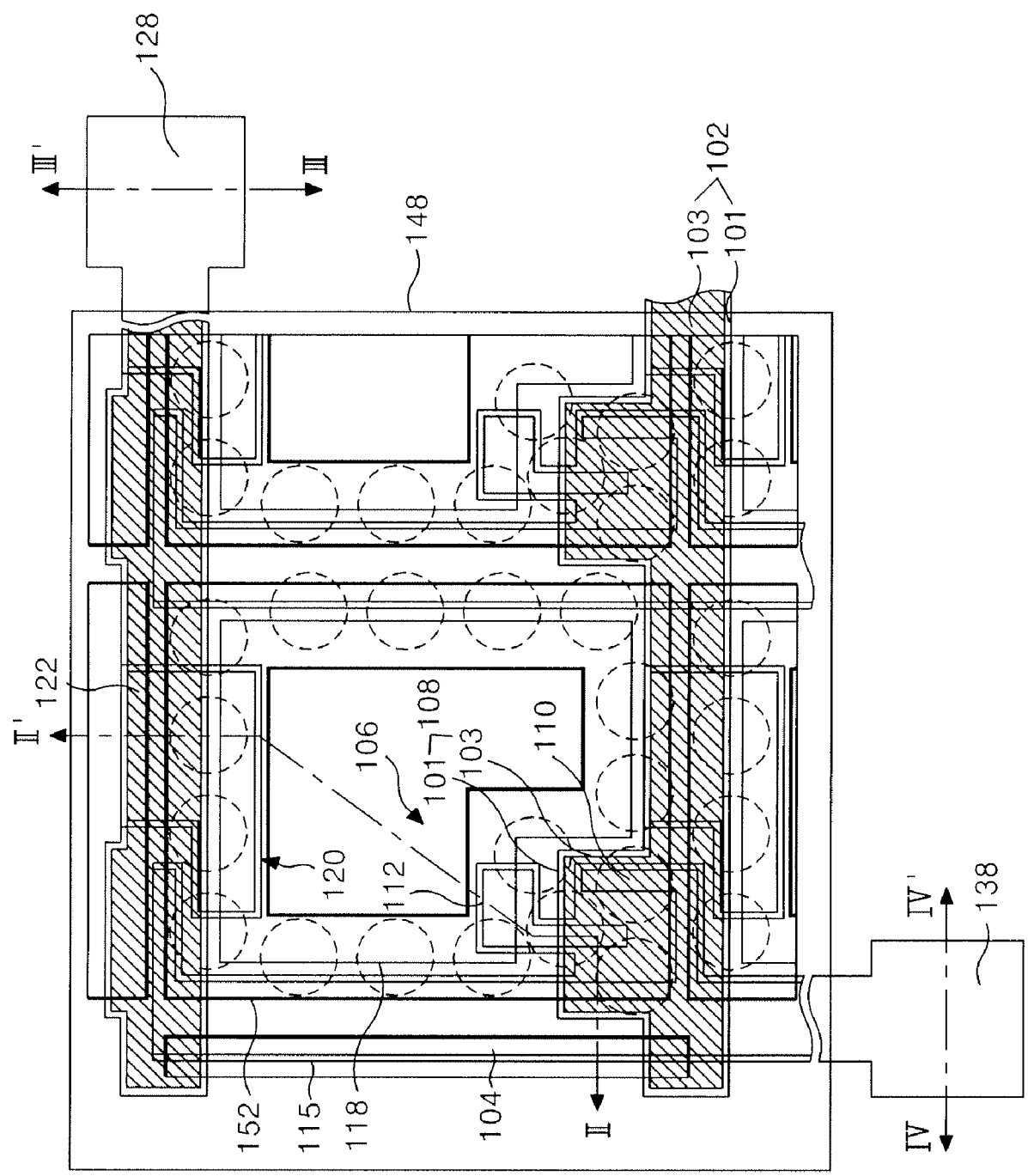

FIGS. 11A and 11B illustrate a plane view and a sectional view, respectively, of a fourth mask process utilized in fabricating a transflective thin film transistor substrate according to the present invention. As illustrated in FIG. 11B, the reflective electrode 152 is formed in each pixel reflective area using the fourth mask process.

Specifically, a reflective metal layer is formed on the embossed surface of the organic film 148, and the reflective metal layer maintains the embossed shape. The reflective metal layer has a double-layered structure including a first reflective metal layer 151 having a small contact resistance with a pixel electrode material, for example, Mo, and a second reflective metal layer 153 having a high reflectibility like AlNd. Subsequently, the first and the second reflection metal layers 151 and 153 are patterned using a photolithography process with the fourth mask and a etching process, thereby forming the reflective electrode 152 in the reflective area of each pixel. The reflective electrode 152 connects the drain electrode 112 with the pixel electrode 118 through the edge part of the transmission hole 154, and connects the upper storage electrode 122 with the pixel electrode 118. Accordingly, no separate contact hole is required for connecting the pixel electrode 118 with the drain electrode 112 and the upper storage electrode 122, thus the aperture ratio of the transmissive area is increased. Furthermore, the first reflection metal layer 151 of the reflective electrode 152 is connected to the pixel electrode 118, that is, a transparent conductive layer, it is possible to reduce a contact resistance.

As described above, the transflective thin film transistor substrate and the method of fabricating the same according to the present invention forms the pixel electrode using a halftone or a diffractive exposure mask like the gate pattern, and connects the pixel electrode 118 to the drain electrode 112 and the upper storage electrode 122 using the reflective electrode 152, thereby reducing the process by at least one mask process as compared to the prior art.

Figure 12:
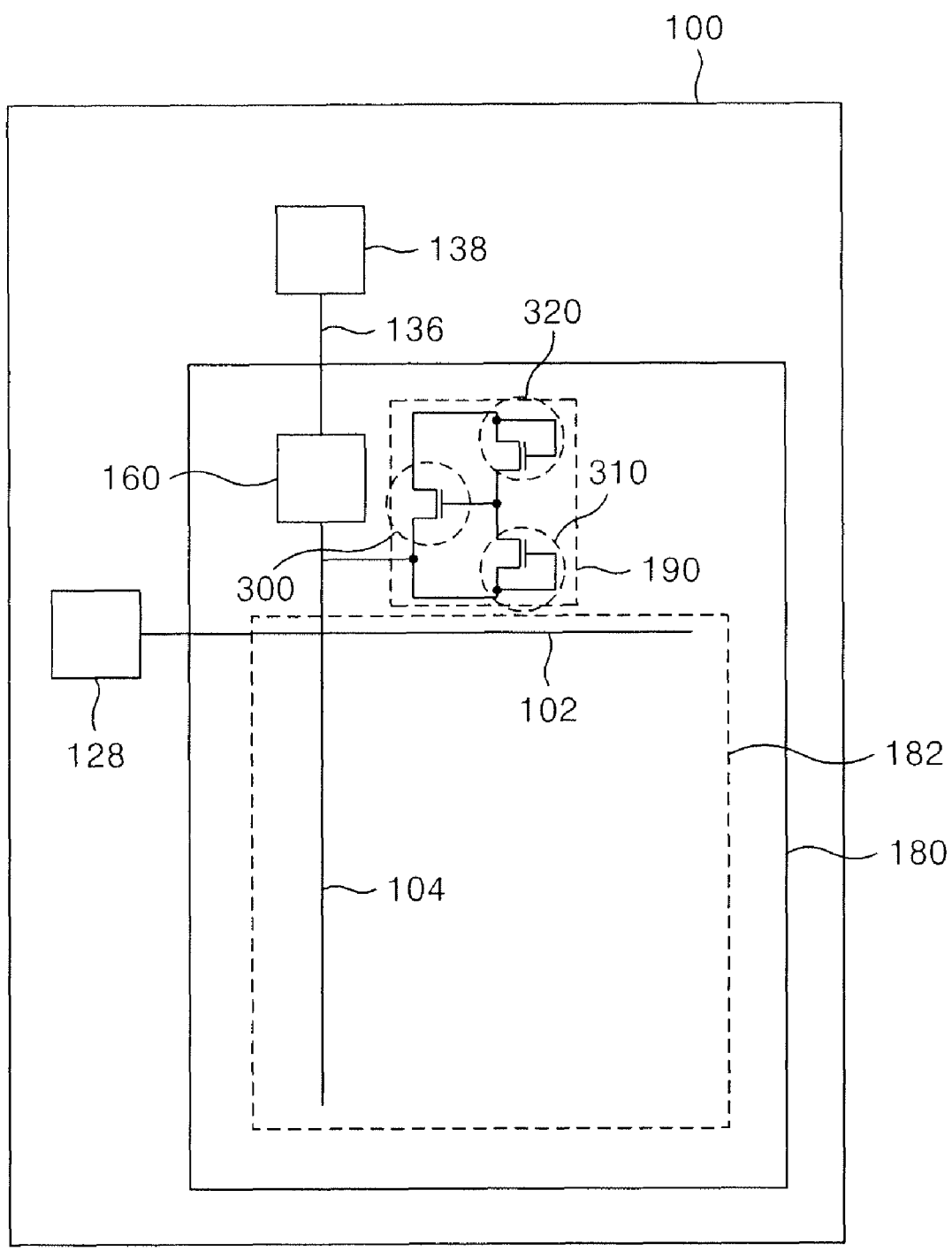
FIG. 12 is a plane view briefly illustrating the transflective thin film transistor substrate according to the present invention, with a surrounding part centered.

FIG. 12 illustrates an ambient part of the transflective thin film transistor substrate according to the present invention. As illustrated, the transflective thin film transistor substrate 100 includes a contact electrode 160 connecting the data pad 138 formed in the same layer as the gate pad 128 with the data line 104. In other words, the contact electrode 160 connects a data link 136 extending from the data pad 138 with the data line 104. The contact electrode 160 is formed of the same metal layer AlNd, AlNd/Mo as the reflective electrode 152 that is formed in the active area 182. The contact electrode 160 has a problem that it is corroded by oxidization when it is exposed to the outside, thus it is located in an area which is sealed by a sealant 180, i.e., between the sealant 180 and the active area 182.

Furthermore, the thin film transistor substrate 100 includes an electrostatic discharging device 190 for intercepting the static electricity flowing into the active area 182. The electrostatic discharging device 190 is connected to the data line 104 or the gate line 102, and includes a plurality of thin film transistors 300, 310, 320 having a reciprocal connection relationship. The static electricity prevention device 190 causes any over current to be discharged by having low impedance at a high voltage area by the static electricity, thereby intercepting the static electricity inflow. In addition, it does not affect a drive signal supplied through the gate line 102 or the data line 104 by having high impedance at a normal drive environment. The electrostatic discharging device 190 requires a plurality of contact electrodes for reciprocally connecting the thin film transistors 300, 310, 320. The contact electrodes are also formed of the same metal layer AlNd, AlNd/Mo as the reflective electrode 152. Accordingly, the electrostatic discharging device 190 is also formed at the area sealed by the sealant 180, i.e., between the sealant 180 and the active area 182.

Figure 13:
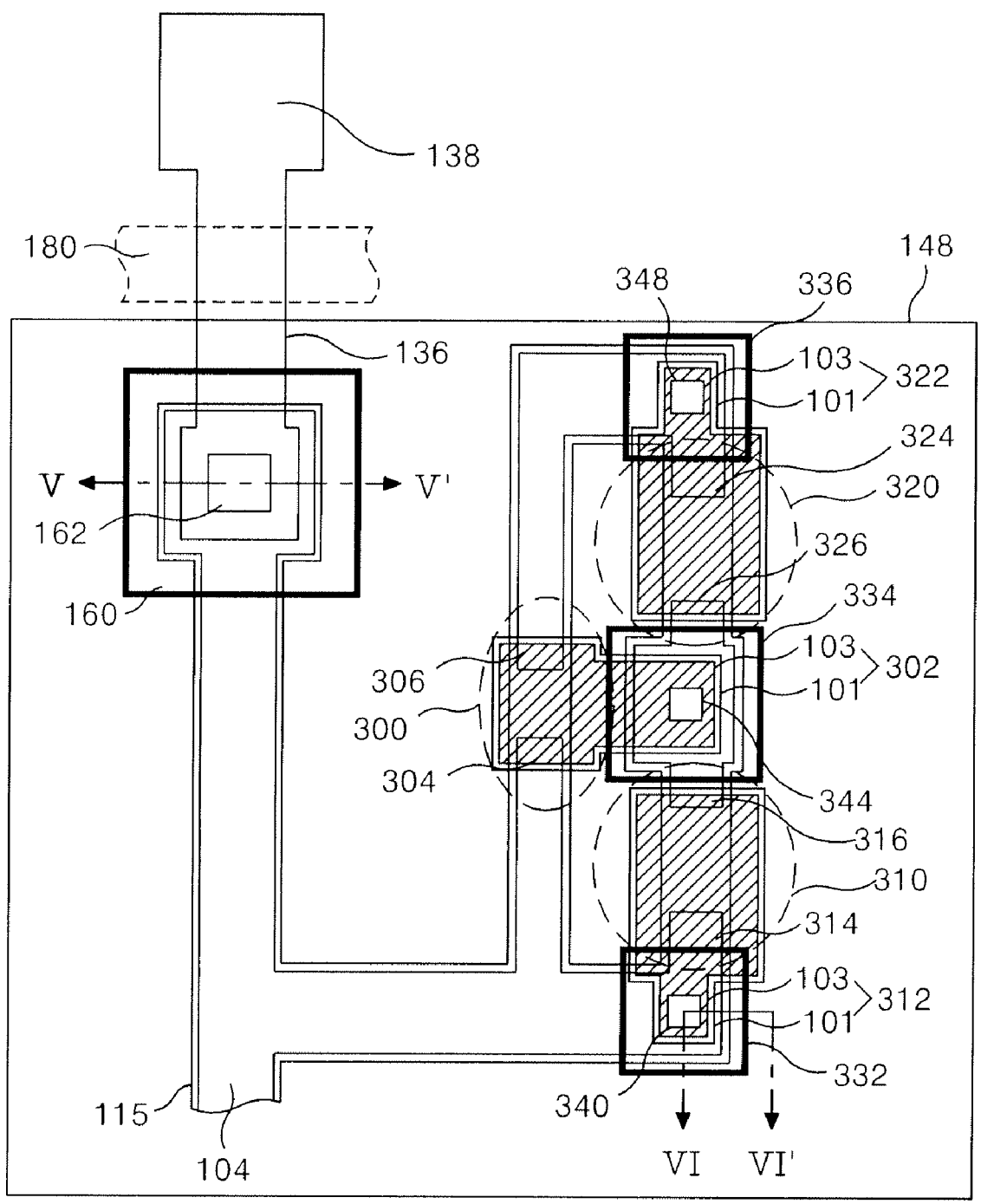
FIG. 13 is a plane view illustrating a static electricity prevention device area and a contact area of a data link and a data line illustrated in FIG. 12.
Figure 14:
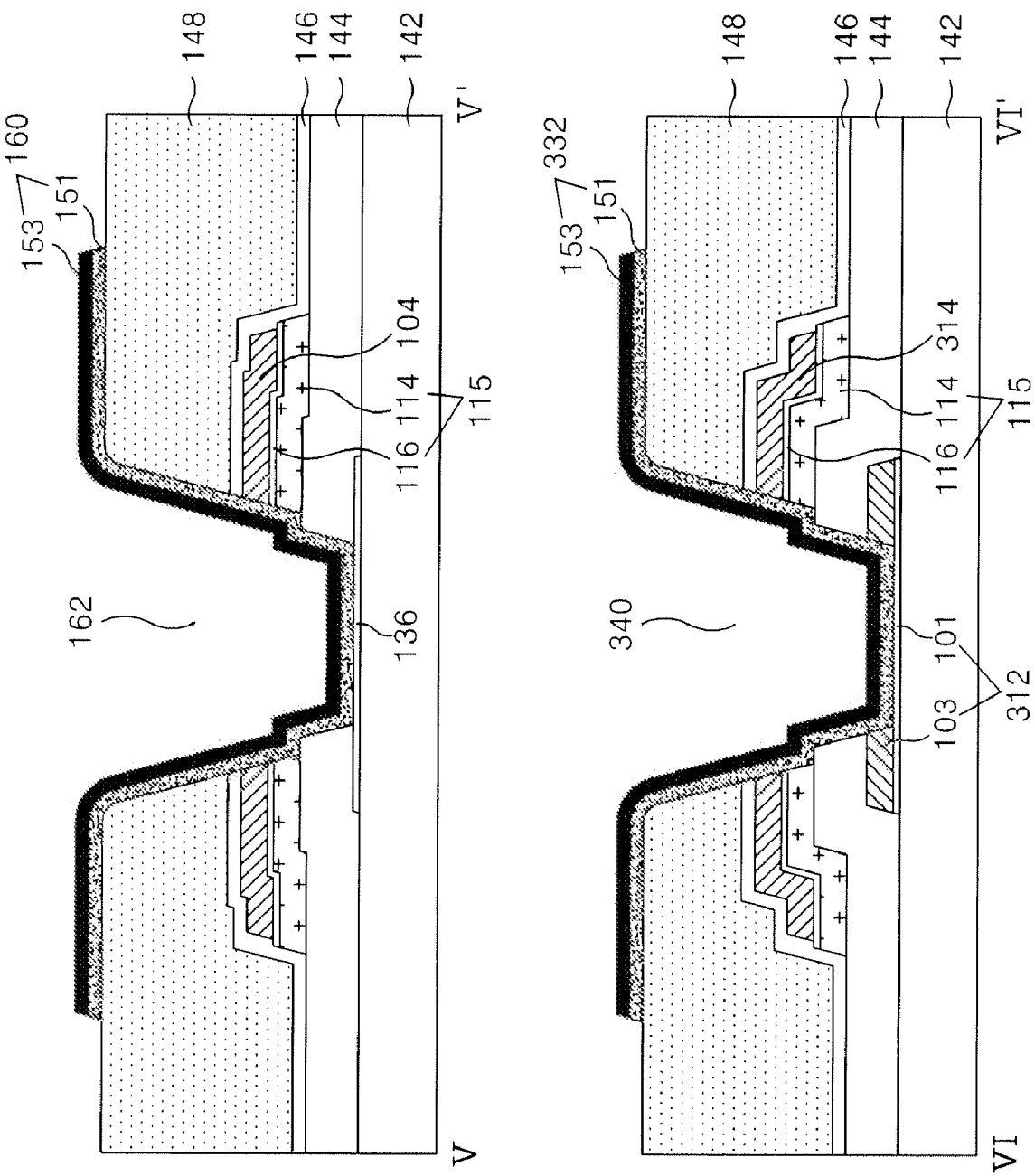
FIG. 14 is sectional view illustrating the transflective thin film transistor substrate of FIG. 13 taken along the line V-V' and VI-VI'.

FIG. 13 is a plane view illustrating the electrostatic discharging device 190 and the contact electrode 160 connected to the data line 104 illustrated in FIG. 12, and FIG. 14 is a sectional view illustrating the thin film transistor substrate taken along the line V-V', VI-VI' of FIG. 13.

Referring to FIGS. 13 and 14, a data link 136 overlaps an end part of the data line 104 extending from the data pad 138 and located in the area sealed by the sealant 180. The data link 136 has the transparent conductive layer, that is, the first conductive layer 101, like the data pad 138.

The first contact electrode 160 is formed over the first contact hole 162 formed at the overlapped part of both the data link 136 and the data line 104 to connect the data line 104 to the data link 136. The first contact hole 162 penetrates the organic film 148, the passivation film 146, the data line 104, the semiconductor pattern 115, and the gate insulating film 144, exposing the data link 136. Accordingly, the first contact hole 160 is connected to a side surface of the data line 104 that is exposed through the first contact hole 162, and the first contact hole 160 is connected to a surface of the data link 136.

The electrostatic discharging device connected to the data line 104 includes the second to fourth thin film transistors 300, 310, 320. The second thin film transistor 300 includes a second source electrode 304 connected to the data line 104, a second drain electrode 306 opposite the second source electrode 304, and a second gate electrode 302 overlapping the second source and drain electrodes 304, 306 with the semiconductor pattern 115 and the gate insulating film 144 there between. The second gate electrode 302 has a double layer structure including the first and second conductive layers 101, 103.

The third thin film transistor 310 is connected to the second source electrode 304 and the second gate electrode 302 of the second thin film transistor in a diode form. For this, the third thin film transistor 310 includes a third source electrode 314 connected to the second source electrode 304, a third drain electrode 316 opposite the third source electrode 314, and a third gate electrode 312 overlapping the third source and drain electrodes 314, 316 with the semiconductor pattern 115 and the gate insulating film 144 there between. The third gate electrode 312 has a double layer structure including the first and second conductive layers 101, 103. In addition, the third gate electrode 312 is connected to the third source electrode 314 through a second contact electrode 332 formed over the second contact hole 340. The second contact hole 340 penetrates the organic film 148, the passivation film 146, the third source electrode 314, the semiconductor pattern 115, the gate insulating film 144 and the second conductive layer 103 of the third gate electrode 312 exposing the first conductive layer 101 of the third gate electrode 312.

The fourth thin film transistor 320 is connected to the second drain electrode 306 and the second gate electrode 302 of the second thin film transistor in a diode form. For this, the fourth thin film transistor 320 includes a fourth source electrode 324 connected to the second drain electrode 306, a fourth drain electrode 326 opposite to the fourth source electrode 324, and a fourth gate electrode 322 overlapping the fourth source and drain electrodes 324, 326 with the semiconductor pattern 115 and the gate insulating film 144 there between. The fourth gate electrode 322 has a double layer structure including the first and second conductive layers 101, 103. In addition, the fourth drain electrode 326 is connected to the third drain electrode 316, and it is connected to the second gate electrode 302 through the third contact electrode 334 which is formed over a third contact hole 344. Furthermore, the fourth gate electrode 332 is connected to the fourth source electrode 324 through the fourth contact electrode 336 which is formed over a fourth contact hole 348. The third contact hole 344 penetrates the organic film 148, the passivation film 146, the fourth drain electrode 326, the semiconductor pattern 115, the gate insulating film 144, and the first conductive layer 103 of the second gate electrode 302. The fourth contact hole 348 penetrates the organic film 148, the passivation film 146, the fourth source electrode 324 and the semiconductor pattern 115, the gate insulating film 144 and the first conductive layer 103 of the fourth gate electrode 322.

Herein, the first to fourth contact electrodes 160, 332, 334, 336 are formed to have a double layer structure wherein first and second reflective metal layers are deposited at the same metal layer as the reflective electrode 152 as described above. Accordingly, since the first reflection metal layer 151 of the first to the fourth contact electrodes 160, 332, 334, 336 is connected the first conductive layer 103, that is, the transparent conductive layer, it is possible to reduce a contact resistance.

The transflective thin film transistor substrate having such a structure is formed using four mask processes as described above. This will be explained with reference to FIGS. 15A to 19B.

Figure 15A:
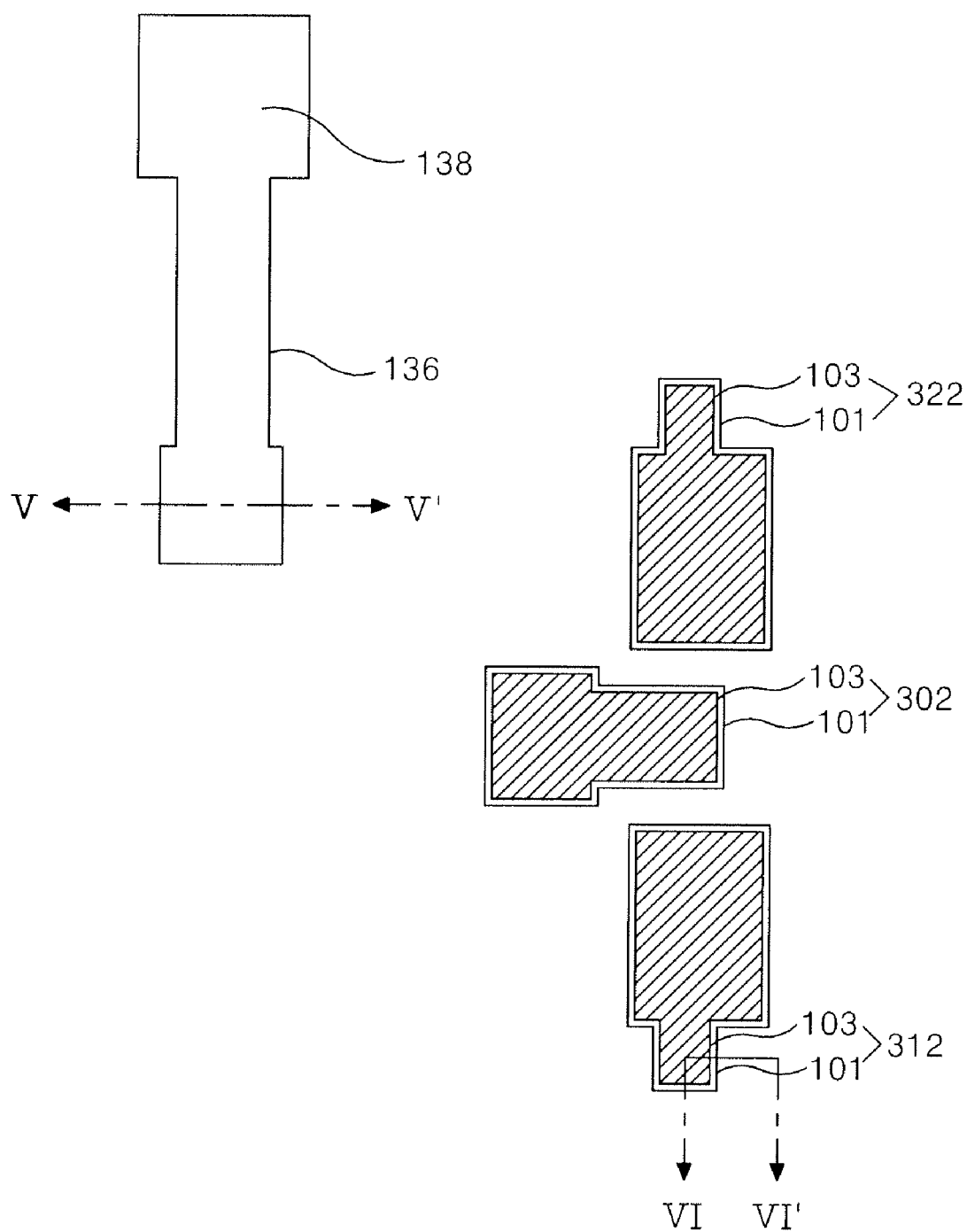

Referring to FIGS. 15A and 15B, a gate pattern is formed on the lower substrate 142 using the first mask process, wherein the gate pattern includes the data link 136 along with the data pad 138, and the second to fourth gate electrodes 302, 312, 322. Herein, the data pad 138 and the data link 136 are formed to have only the transparent conductive layer, that is, the first conductive layer 101, and the gate pattern including the second to the fourth gate electrodes 302, 312 and 322 has a double layer structure in which the first and the second conductive layers 101 and 103 are deposited. The first mask process uses the half-tone mask (or the diffractive mask) as described in FIGS. 5A and 6E.

Figure 16A:
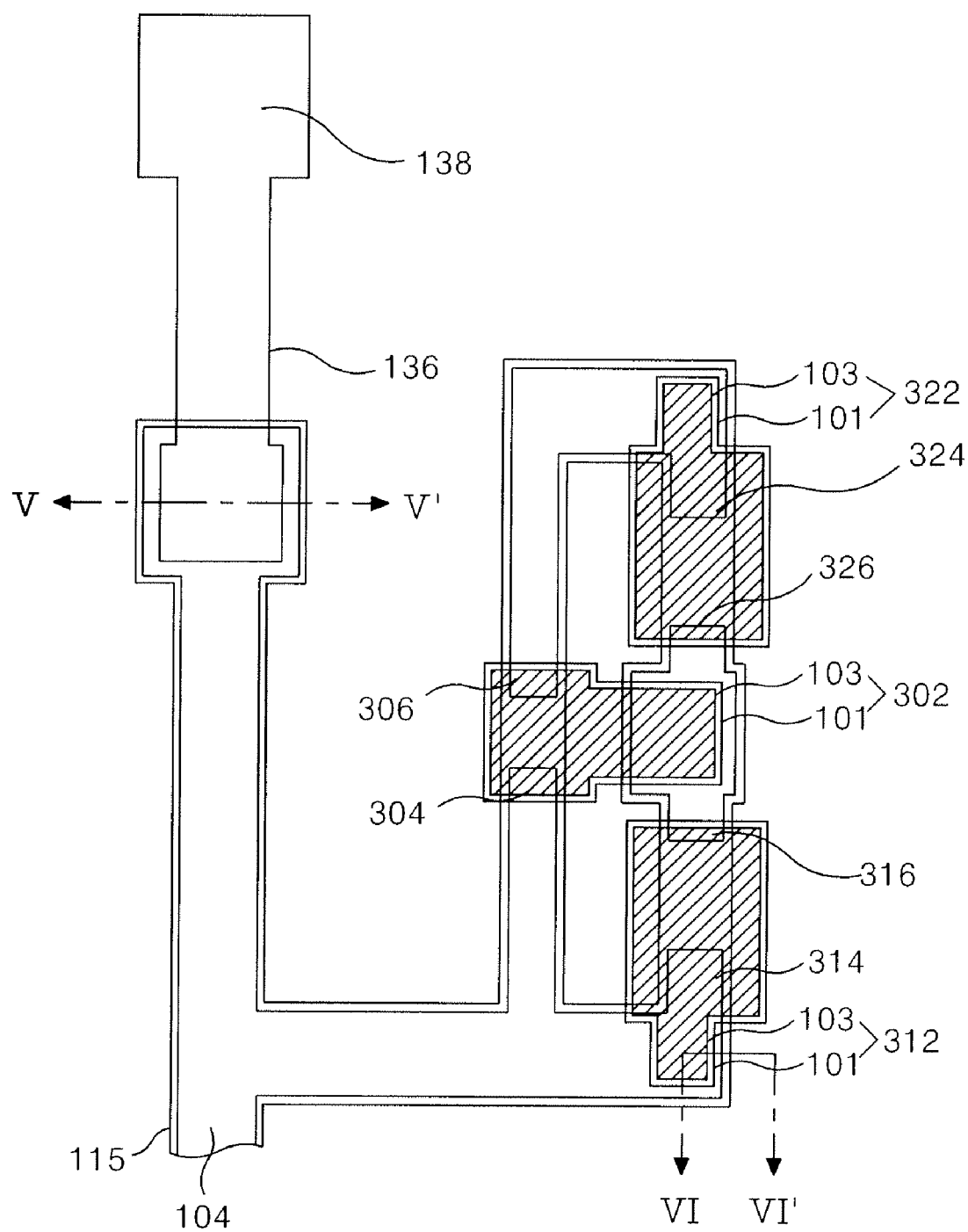

Referring to FIGS. 16A and 16B, a gate insulating film 144, a semiconductor pattern 115 including an active layer 114 and an ohmic contact layer 116, and a source/drain pattern including a data line 104, second to fourth source electrodes 304, 314, 324, and second to fourth drain electrodes 306, 316, 326 are formed using the second mask process. The second mask process is the same as described in FIGS. 7A and 8E.

Figure 17A:
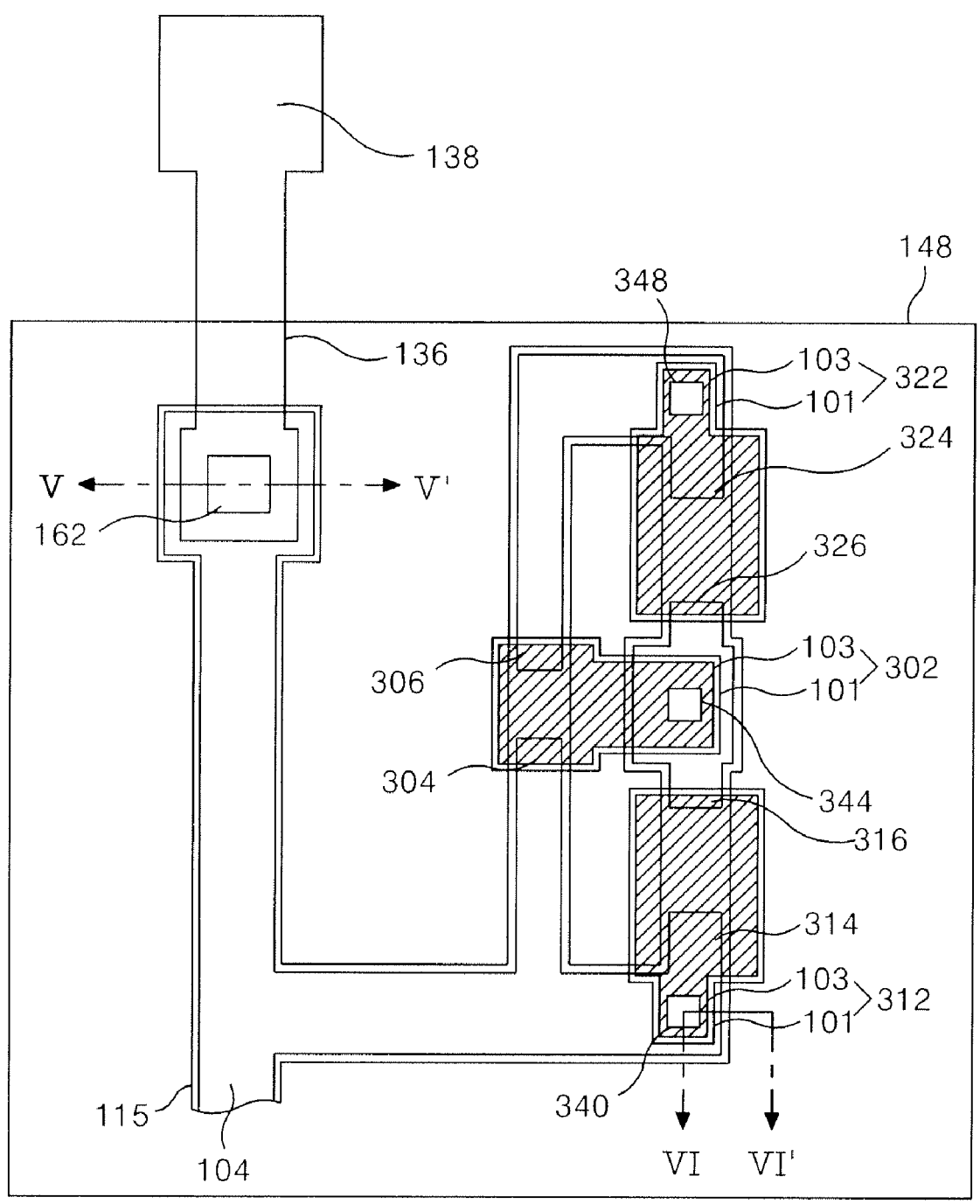
FIGS. 17A and 17B illustrate a plane view and a sectional view, respectively, of a third mask process utilized to fabricate the transflective thin film transistor substrate of FIG. 14.
Figure 17B:
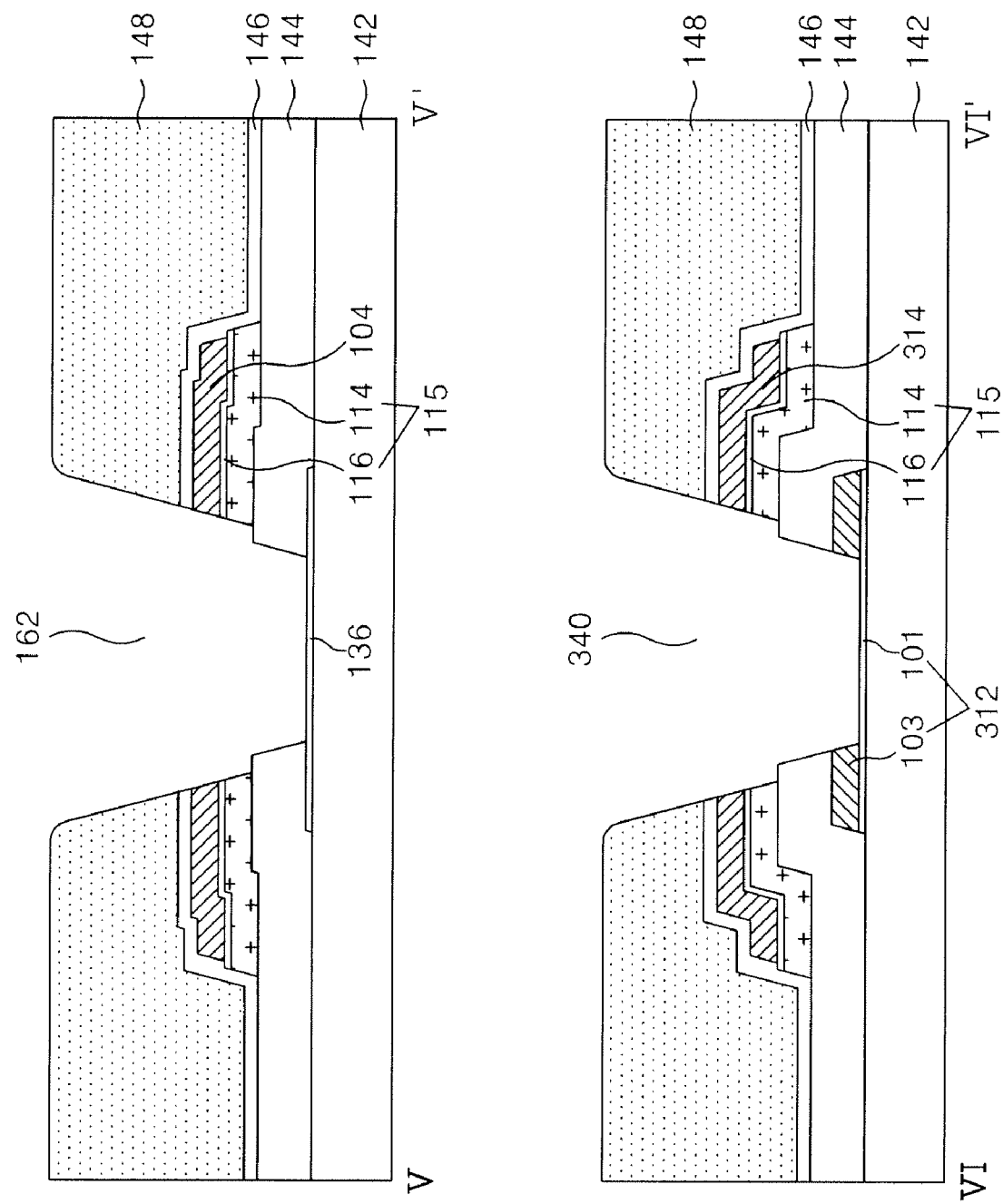

Referring to FIGS. 17A and 17B, a passivation film 146 and an organic film 148 are formed using the third mask process, a first contact hole 162 penetrating from the organic film 148 to the gate insulating film 144 and second to fourth contact holes 340, 344, 348 penetrating to the second conducive layer 103 of the second and third gate electrodes are formed. The third mask process is the same as described in FIGS. 9A to 10C. In this case, the organic film 148 is removed at the pad area and doesn't have an embossed surface in the area where the reflective electrode 152 is not formed.

Figure 18A:
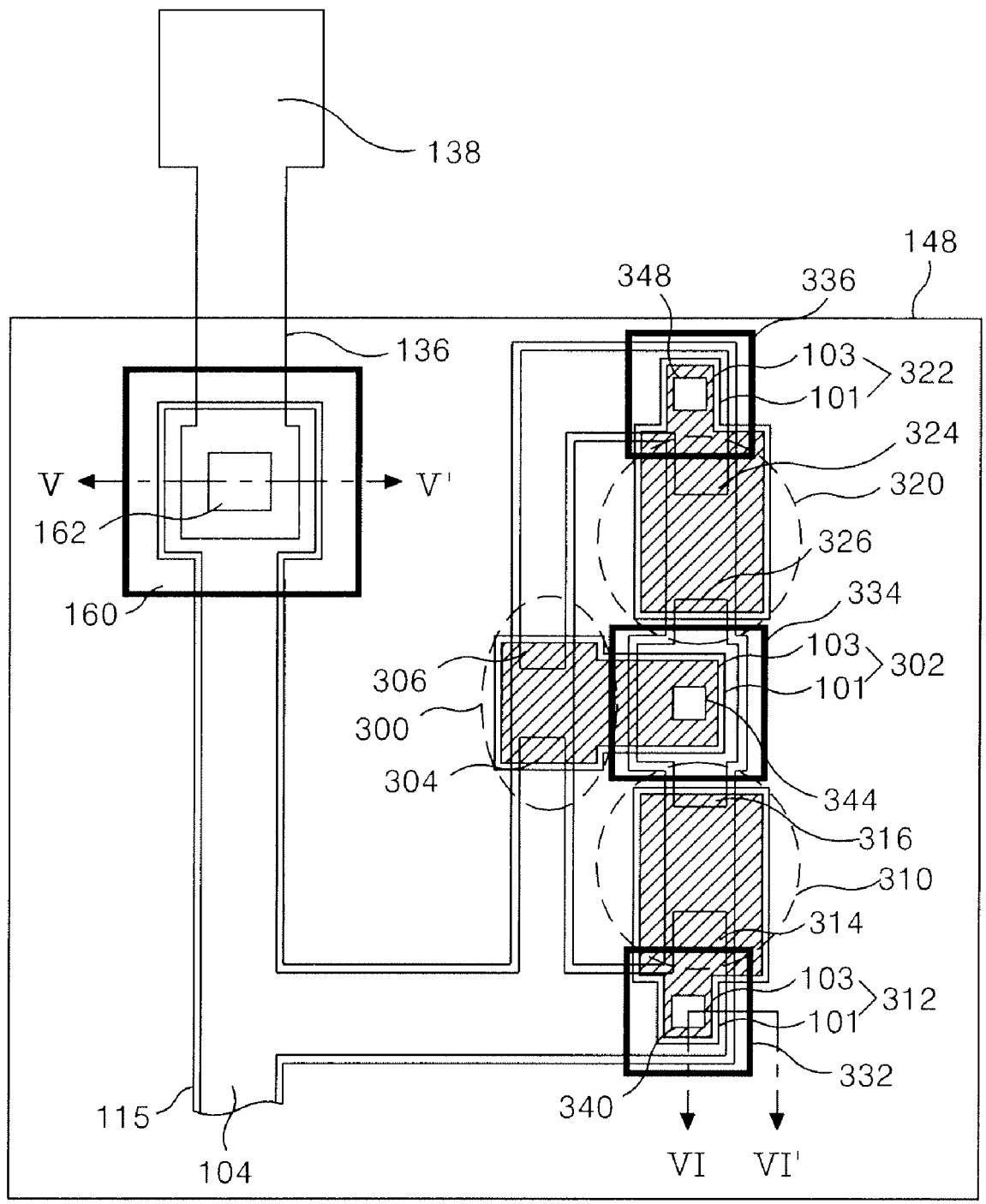
FIGS. 18A and 18B illustrate a plane view and a sectional view, respectively, of a fourth mask process utilized to fabricate the transflective thin film transistor substrate of FIG. 14.
Figure 18B:
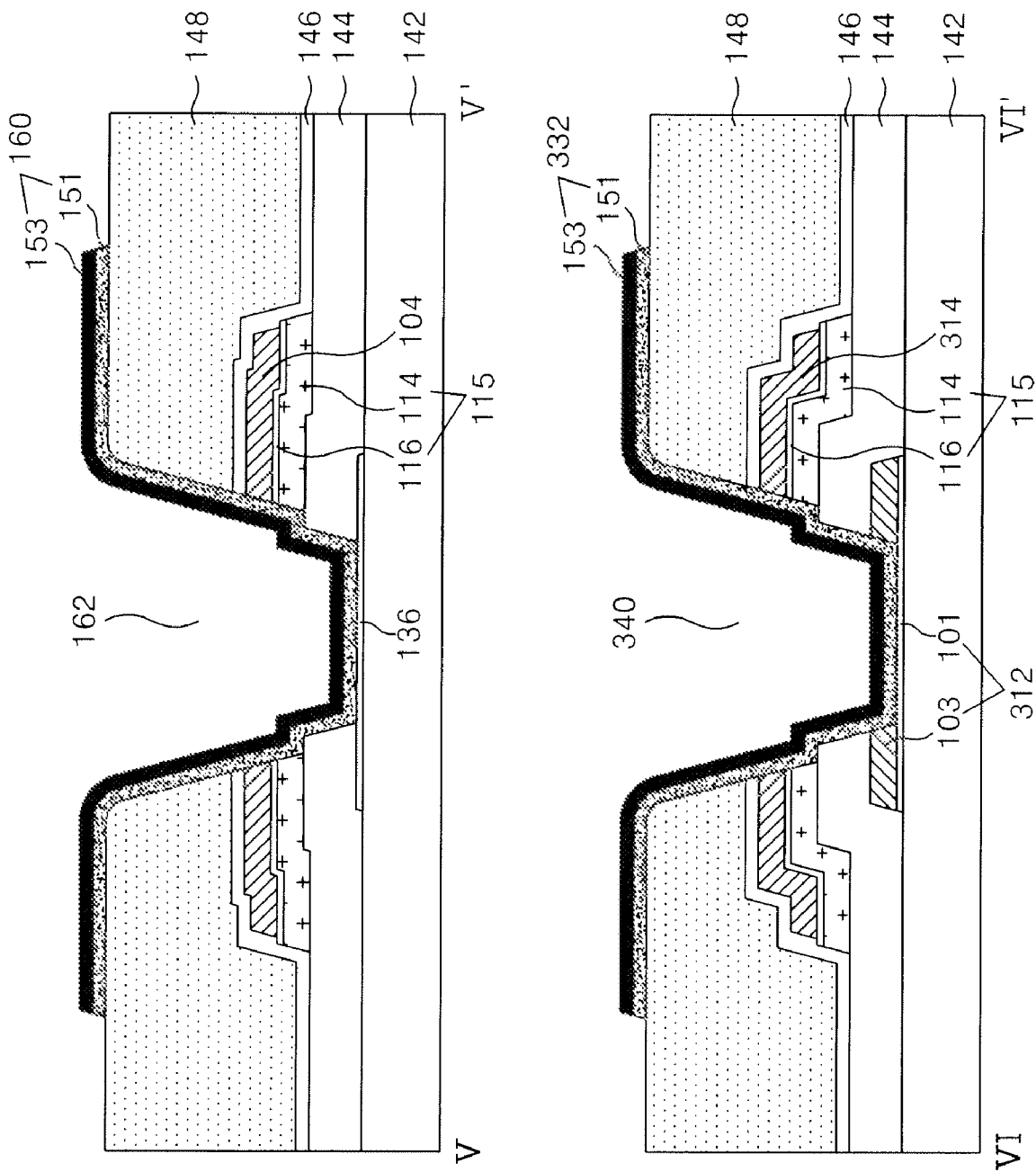

Referring to FIGS. 18A and 18B, first to fourth contact electrodes 162, 332, 334 and 336 are formed having a double layer structure identical to the reflective electrode 152, using the fourth mask process. The fourth mask process is the same as described in FIGS. 11A and 11B.

As described above, in the transflective thin film transistor substrate and the method of fabricating method according to the present invention, the gate pattern of double structure and the transparent conductive pattern of the single layer structure are formed by one mask process using a half-tone mask (or a diffractive mask). Thus, it is possible to simplify the fabrication processes. Furthermore, since the first and the second conductive layers of the gate pattern of the double layer structure have a fixed stepped difference in a step shape, it is possible to prevent an open in the source/drain pattern caused by the steep inclination of the first and the second conductive layers.

Furthermore, in the transflective thin film transistor substrate and the method of fabricating method according to the present invention, the transmission hole exposing the pixel electrode is formed upon patterning the organic film and the reflective electrode passing through the edge part of the transmission hole connects the drain electrode and the upper storage electrode to the pixel electrode. Accordingly, it is possible to simplify the fabrication processes and is not necessary to have a separate contact hole for connecting the pixel electrode with the drain electrode and the upper storage electrode, thus the aperture ratio of the transmissive area is increased.

Further, in the transflective thin film transistor substrate and the method of fabricating same according to the present invention, a contact electrode of the same metal as the reflective electrode connects the data link to the data line, wherein the data link and the data line are formed in layers different from each other, and the thin film transistors of the static electricity prevention device are reciprocally connected. Accordingly, it is possible to simplify processes by performing four mask processes.

Moreover, in the transflective thin film transistor substrate and the method of fabricating method according to the present invention, the reflective electrode and the contact electrode have a double layer structure and the first reflection metal layer that have a low contact resistance is connected to the transparent conductive layer. Accordingly, it is possible to reduce contact resistance.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates;
   a gate line having a double layer structure including a first transparent conductive layer and a second opaque conductive layer on the first substrate;
   a first insulation layer on the gate line;
   a data line crossing the gate line to define a pixel region, the pixel region having a transmissive region and a reflective region;
   a thin film transistor connected to the gate and data lines;
   a pixel electrode formed of the first transparent conductive layer in the pixel region, the pixel electrode being formed on a same layer as the gate line;
   an upper storage electrode overlapping the gate line with the gate insulating film there between to form a storage capacitor;
   a transmission hole exposing the pixel electrode by passing through a second insulation layer on the thin film transistor to the first insulation layer;
   a reflective electrode directly connected to the pixel electrode, a drain electrode and the upper storage electrode exposed through an edge part of the transmission hole so that the reflective electrode connects the pixel electrode to the drain electrode and the upper storage electrode;
   a gate pad extending from the first conductive layer of the gate line;
   a data pad formed of the first conductive layer and connected to the data line through a data link; and
   a liquid crystal layer between the first and second substrates,
   wherein the first and second insulation layers are removed from the gate and data pads.

2. The device of claim 1, further comprising a third insulation layer between the thin film transistor and the second insulation layer.

3. The device of claim 2, wherein the third insulation layer is an inorganic material.

4. The device of claim 2, wherein the transmission hole passes through the third insulation layer.

5. The device of claim 1, wherein the second insulation layer is an organic material.

6. The device of claim 1, further comprising:
   a first contact hole passing through the second insulation layer, the data line and the first insulation layer exposing the data link, the data link being overlapped with an end part of the data line; and
   a first contact electrode substantially laterally connected to the data line via the first contact hole and connected to a surface of the data link.

7. The device of claim 6, wherein the first contact electrode is formed of the same material as the reflective electrode.

8. The device of claim 6, wherein the first contact electrode is formed in a sealant region.

9. The device of claim 6, wherein the reflective electrode and the first contact electrode having a double layer structure of AlNd and Mo.

10. The device of claim 1, further comprising an electrostatic discharging device connected to one of the gate and data lines.

11. The device of claim 10, wherein the electrostatic discharging device comprises:
   a second thin film transistor connected to one of the gate and data lines;
   a third thin film transistor connected between a gate electrode and a source electrode of the second thin film transistor in a diode form;
   a fourth thin film transistor connected between a gate electrode and a drain electrode of the second thin film transistor in a diode form;
   a second contact electrode connected to a source electrode and a gate electrode of the third thin film transistor through a second contact hole;
   a third contact electrode connected to a drain electrode of the third or fourth thin film transistor to the gate electrode of the second thin film transistor through a third contact hole; and
   a fourth contact electrode connected to a source electrode and a gate electrode of the fourth thin film transistor through a fourth contact hole.

12. The device of claim 11, wherein the gate electrodes of the second, third and fourth thin film transistors have a double layer structure.

13. The device of claim 11, wherein the second, third and fourth contact electrodes are formed of the same material as the reflective electrode.

14. The device of claim 11, wherein the second, third and fourth contact holes pass through the source or drain electrode, the semiconductor pattern, the first insulating layer and the second conductive layers of the gate electrodes from the second insulation layer to expose the first conductive layers of the gate electrodes.

15. The device of claim 11, wherein the second, third and fourth contact electrodes are formed in a sealant region.

16. The device of claim 11, wherein the reflective electrode and the second, third and fourth contact electrodes have a double layer structure of AlNd and Mo.

17. The device of claim 1, wherein the second insulation layer has an embossed surface.

18. The device of claim 17, wherein the reflective electrode has an embossed surface.